US012755508B2

(12) United States Patent
Furukawa

(10) Patent No.: US 12,755,508 B2
(45) Date of Patent: Oct. 6, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takeshi Furukawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 18/820,878

(22) Filed: Aug. 30, 2024

(65) Prior Publication Data

US 2024/0420448 A1 Dec. 19, 2024

Related U.S. Application Data

(63) Continuation of application No. PCT/JP2023/000318, filed on Jan. 10, 2023.

(30) Foreign Application Priority Data

Mar. 16, 2022 (JP) ................................ 2022-041153

(51) Int. Cl.
*G06V 10/75* (2022.01)
*G06V 10/50* (2022.01)
(Continued)

(52) U.S. Cl.
CPC ............ *G06V 10/751* (2022.01); *G06V 10/50* (2022.01); *G06V 10/56* (2022.01); *G06V 20/50* (2022.01); *G06V 30/1448* (2022.01)

(58) Field of Classification Search
CPC ...... G06V 10/751; G06V 10/50; G06V 10/56; G06V 20/50; G06V 30/1448; G06V 30/10;
(Continued)

(56) References Cited

U.S. PATENT DOCUMENTS 8,249,815 B2 8/2012 Taylor
8,311,747 B2 11/2012 Taylor
(Continued)

FOREIGN PATENT DOCUMENTS

JP 2019-016098 A 1/2019
JP 2020-142096 A 9/2020
(Continued)

OTHER PUBLICATIONS

Apr. 4, 2023 International Search Report in International Patent Appln. PCT/JP2023/000318.
(Continued)

*Primary Examiner* — Stephen R Koziol
*Assistant Examiner* — Michael Kim Maiden
(74) *Attorney, Agent, or Firm* — Venable LLP

(57) ABSTRACT

An information processing apparatus identifies each of the plurality of objects based on a feature of a first type until a distance between the plurality of objects becomes smaller than a threshold; and identifies each of the plurality of objects based on a feature of a second type, in a case where the distance between the plurality of objects becomes the threshold or larger than the threshold after the distance between the plurality of objects becomes smaller than the threshold.

16 Claims, 10 Drawing Sheets

(51) Int. Cl.
*G06V 10/56* (2022.01)
*G06V 20/50* (2022.01)
*G06V 30/14* (2022.01)

(58) Field of Classification Search
CPC ........... G06T 7/00; G06T 15/20; G06T 19/00; H04N 7/18
See application file for complete search history.

(56) References Cited

U.S. PATENT DOCUMENTS

| | | | | |
|---|---|---|---|---|
| 8,311,748 | B2 | 11/2012 | Taylor | |
| 8,311,750 | B2 | 11/2012 | Taylor | |
| 8,315,812 | B2 | 11/2012 | Taylor | |
| 8,315,813 | B2 | 11/2012 | Taylor | |
| 8,315,814 | B2 | 11/2012 | Taylor | |
| 8,321,150 | B2 | 11/2012 | Taylor | |
| 8,386,188 | B2 | 2/2013 | Taylor | |
| 8,496,594 | B2 | 7/2013 | Taylor | |
| 8,523,779 | B2 | 9/2013 | Taylor | |
| 8,594,950 | B2 | 11/2013 | Taylor | |
| 8,606,530 | B2 | 12/2013 | Taylor | |
| 8,630,812 | B2 | 1/2014 | Taylor | |
| 8,734,356 | B2 | 5/2014 | Taylor | |
| 8,734,357 | B2 | 5/2014 | Taylor | |
| 8,812,245 | B2 | 8/2014 | Taylor | |
| 8,812,246 | B2 | 8/2014 | Taylor | |
| 9,078,564 | B2 | 7/2015 | Taylor | |
| 9,081,882 | B2 | 7/2015 | Taylor | |
| 9,149,197 | B2 | 10/2015 | Taylor | |
| 9,152,757 | B2 | 10/2015 | Taylor | |
| 9,167,974 | B2 | 10/2015 | Taylor | |
| 9,226,672 | B2 | 1/2016 | Taylor | |
| 9,235,679 | B2 | 1/2016 | Taylor | |
| 9,268,902 | B2 | 2/2016 | Taylor | |
| 9,271,657 | B2 | 3/2016 | Taylor | |
| 9,449,147 | B2 | 9/2016 | Taylor | |
| 9,585,723 | B2 | 3/2017 | Taylor | |
| 9,697,330 | B2 | 7/2017 | Taylor | |
| 9,706,925 | B2 | 7/2017 | Taylor | |
| 9,743,835 | B2 | 8/2017 | Taylor | |
| 9,801,689 | B2 | 10/2017 | Taylor | |
| 9,839,484 | B2 | 12/2017 | Taylor | |
| 9,855,105 | B2 | 1/2018 | Taylor | |
| 9,861,284 | B2 | 1/2018 | Taylor | |
| 9,888,971 | B2 | 2/2018 | Taylor | |
| 10,179,030 | B2 | 1/2019 | Taylor | |
| 10,682,180 | B2 | 6/2020 | Taylor | |
| 10,999,535 | B2 | 5/2021 | Shuden | |
| 11,665,332 | B2 | 5/2023 | Furukawa | |
| 2012/0041318 | A1 | 2/2012 | Taylor | |
| 2012/0041319 | A1 | 2/2012 | Taylor | |
| 2012/0041320 | A1 | 2/2012 | Taylor | |
| 2012/0041321 | A1 | 2/2012 | Taylor | |
| 2012/0041322 | A1 | 2/2012 | Taylor | |
| 2012/0041323 | A1 | 2/2012 | Taylor | |
| 2012/0041324 | A1 | 2/2012 | Taylor | |
| 2012/0041735 | A1 | 2/2012 | Taylor | |
| 2012/0041739 | A1 | 2/2012 | Taylor | |
| 2012/0053919 | A1 | 3/2012 | Taylor | |
| 2012/0053921 | A1 | 3/2012 | Taylor | |
| 2012/0059246 | A1 | 3/2012 | Taylor | |
| 2012/0150516 | A1 | 6/2012 | Taylor | |
| 2013/0054214 | A1 | 2/2013 | Taylor | |
| 2013/0064438 | A1 | 3/2013 | Taylor | |
| 2013/0066618 | A1 | 3/2013 | Taylor | |
| 2013/0151163 | A1 | 6/2013 | Taylor | |
| 2013/0211728 | A1 | 8/2013 | Taylor | |
| 2014/0107935 | A1 | 4/2014 | Taylor | |
| 2014/0148693 | A1 | 5/2014 | Taylor | |
| 2020/0090375 | A1* | 3/2020 | Mori | G02B 27/01 |
| 2020/0106968 | A1 | 4/2020 | Shuden | |
| 2020/0329228 | A1 | 10/2020 | Furukawa | |

FOREIGN PATENT DOCUMENTS

| | | | |
|---|---|---|---|
| JP | 2020-173628 | A | 10/2020 |
| JP | 2021-086573 | A | 6/2021 |
| WO | 2019/021375 | A1 | 1/2019 |

OTHER PUBLICATIONS

May 20, 2025 Japanese Official Action in Japanese Patent Appln. No. 2022-041153.

* cited by examiner

901

| ID | IDENTIFICATION RESULT | COORDINATE INFORMATION (X, Y) | DISTANCE STATE | TARGET OBJECT | IDENTIFICATION METHOD |
|---|---|---|---|---|---|
| 0 | PLAYER A | (48000,16000) | INDEPENDENT | | – |
| 1 | PLAYER B | (40000,15500) | INDEPENDENT | | – |
| 2 | BALL | (20000,18000) | INDEPENDENT | | – |
| 3 | PLAYER C | (10000,18000) | INDEPENDENT | | – |

FIG.9A

902

| ID | IDENTIFICATION RESULT | COORDINATE INFORMATION (X, Y) | DISTANCE STATE | TARGET OBJECT | IDENTIFICATION METHOD |
|---|---|---|---|---|---|
| 0 | PLAYER A | (48000,16000) | APPROACH | 1 | COLOR INFORMATION |
| 1 | PLAYER B | (47000,15000) | APPROACH | 0 | COLOR INFORMATION |
| 2 | BALL | (20000,18000) | APPROACH | 3 | VOLUME |
| 3 | PLAYER C | (19000,17000) | APPROACH | 2 | VOLUME |

FIG.9B

903

| ID | IDENTIFICATION RESULT | COORDINATE INFORMATION (X, Y) | DISTANCE STATE | TARGET OBJECT | IDENTIFICATION METHOD |
|---|---|---|---|---|---|
| 0 | PLAYER A AND PLAYER B | (48000,16000) | OVERLAP | 0.1 | COLOR INFORMATION |
| | | | | | |
| 2 | BALL | (20000,18000) | APPROACH | 3 | VOLUME |
| 3 | PLAYER C | (19000,17000) | APPROACH | 2 | VOLUME |

FIG.9C

904

| ID | IDENTIFICATION RESULT | COORDINATE INFORMATION (X, Y) | DISTANCE STATE | TARGET OBJECT | IDENTIFICATION METHOD |
|---|---|---|---|---|---|
| 0 | | (4000,16000) | OVERLAP CANCEL | 1 | COLOR INFORMATION |
| 1 | | (48500,16500) | OVERLAP CANCEL | 0 | COLOR INFORMATION |
| 2 | BALL | (20000,18000) | APPROACH | 3 | VOLUME |
| 3 | PLAYER C | (19000,17000) | APPROACH | 2 | VOLUME |

FIG.9D

905

| ID | IDENTIFICATION RESULT | COORDINATE INFORMATION (X, Y) | DISTANCE STATE | TARGET OBJECT | IDENTIFICATION METHOD |
|---|---|---|---|---|---|
| 0 | PLAYER A | (48000,16000) | OVERLAP CANCEL | 1 | COLOR INFORMATION |
| 1 | PLAYER B | (48500,16500) | OVERLAP CANCEL | 0 | COLOR INFORMATION |
| 2 | BALL | (20000,18000) | APPROACH | 3 | VOLUME |
| 3 | PLAYER C | (19000,17000) | APPROACH | 2 | VOLUME |

FIG.9E

INFORMATION PROCESSING APPARATUS, INFORMATION PROCESSING METHOD, AND STORAGE MEDIUM

CROSS-REFERENCE TO RELATED APPLICATIONS

This application is a Continuation of International Patent Application No. PCT/JP2023/000318, filed Jan. 10, 2023, which claims the benefit of Japanese Patent Application No. 2022-041153, filed Mar. 16, 2022, both of which are hereby incorporated by reference herein in their entirety.

BACKGROUND

Field

The present disclosure relates to generation of data based on captured images.

Description of the Related Art

There is a method of generating three-dimensional shape data (hereinafter, referred to as three-dimensional models in some cases) expressing three-dimensional shapes of objects based on multiple captured images obtained by performing image capturing with multiple image capturing apparatuses arranged around the objects. There is a method of generating a virtual viewpoint image that is an image from any viewpoint, by using the three-dimensional models and texture information obtained from the captured images. Moreover, in some cases, which object each of objects in the virtual viewpoint image is needs to be managed.

International Publication No. WO2019/021375 discloses a method of identifying multiple objects in a three-dimensional space.

CITATION LIST

Patent Literature

PTL1 International Publication No. WO2019/021375

SUMMARY

An information processing apparatus of the present disclosure obtain information for each of a plurality of objects included in an image capturing space of an image capturing apparatus, identify each of the plurality of objects based on a feature of a first type among a plurality of types until a distance between the plurality of objects becomes smaller than a threshold, and identify each of the plurality of objects based on a feature of a second type that is among the plurality of types and that is different from the first type, in a case where the distance between the plurality of objects becomes the threshold or larger than the threshold after the distance between the plurality of objects becomes smaller than the threshold.

Further features of the present disclosure will become apparent from the following description of an embodiment to be given with reference to the attached drawings.

BRIEF DESCRIPTION OF THE DRAWINGS

FIGS. 9A to 9E are diagrams for explaining an example of object identification information.

DESCRIPTION OF THE EMBODIMENTS

International Publication No. WO2019/021375 states that the multiple objects in the three-dimensional space are identified by using a feature of a color of each object, a uniform number, or a signal transmitted from a sensor attached to each object. However, in order to extract the feature of the color or the uniform number from images, image processing for extraction is necessary, and processing load thus increases. Moreover, in the method using the sensor, a cost increases due to introduction of the sensor.

Details of a technique of the present disclosure are explained below based on embodiments with reference to the attached drawings. Note that configurations illustrated in the following embodiments are merely examples, and the technique of the present disclosure is not limited to the illustrated configurations.

Moreover, terms whose reference signs differ only in the alphabets attached behind the numbers are assumed to indicate different instances of devices with an identical function. In the case where any one of the devices with the identical function is referred to, the alphabet in the reference sign is omitted in some cases.

Embodiment 1

[System Configuration]

Figure 1A:
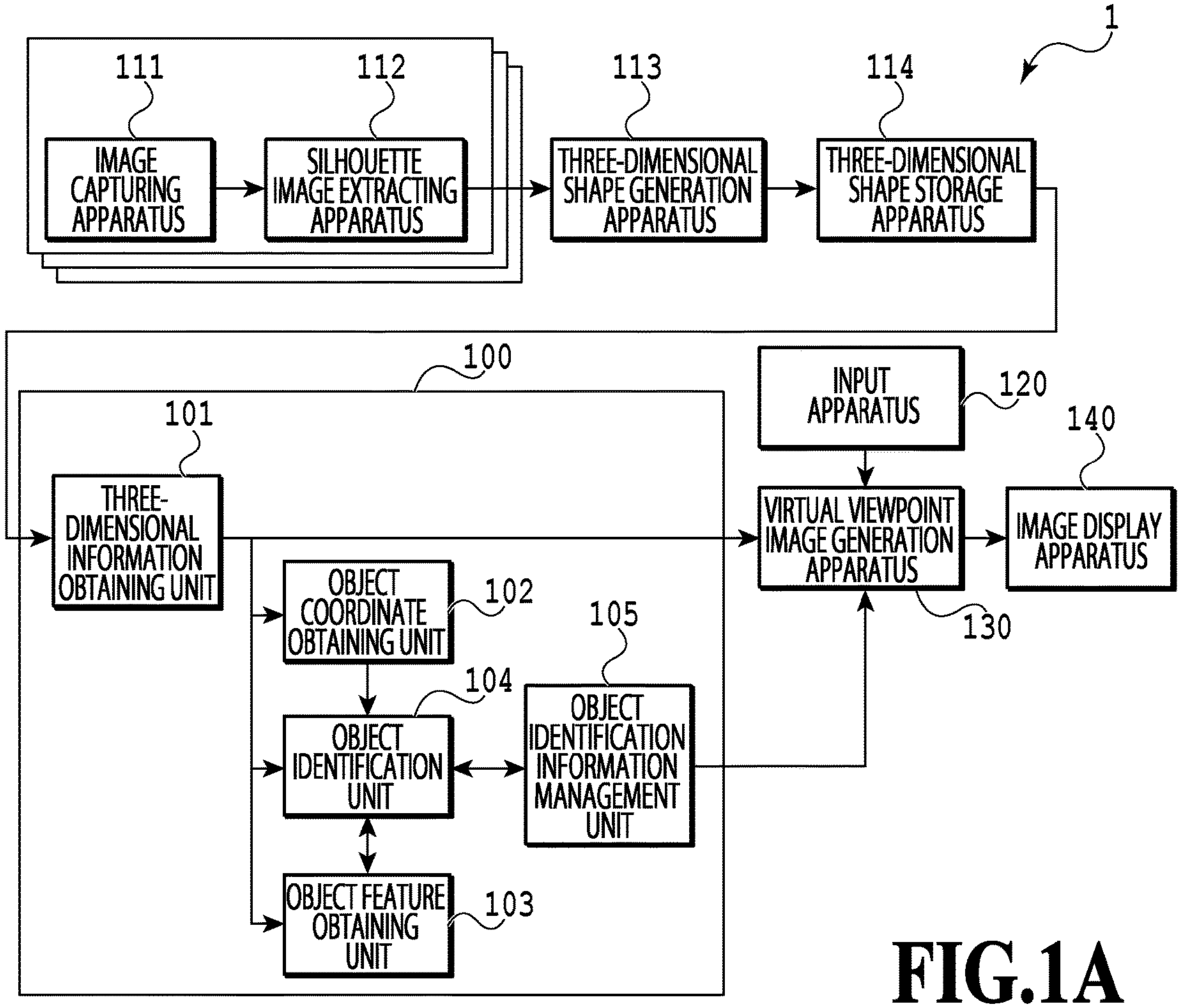
FIGS. 1A and 1B are diagrams illustrating a schematic configuration of an information processing system.

FIG. 1A is a diagram illustrating an example of an image processing system 1 that generates a virtual viewpoint image. The virtual viewpoint image is an image expressing view from a virtual viewpoint that is independent of viewpoints from actual image capturing apparatuses. The virtual viewpoint image is generated as follows. Multiple image capturing apparatuses are installed at different positions to time-synchronously capture images from multiple viewpoints, and the multiple images obtained by this image capturing are used to generate the virtual viewpoint image. Since the virtual viewpoint image allows a user to view and browse a highlight scene of a game such as a soccer from various angles, the virtual viewpoint image can provide higher realistic sensations to the user than a normal captured image. Note that the virtual viewpoint image may be a moving image or a still image. In the following embodiment, explanation is given assuming that the virtual viewpoint image is a moving image.

The image processing system 1 includes multiple image capturing apparatuses 111, silhouette image extracting apparatuses 112 connected to the respective image capturing apparatuses 111, a three-dimensional shape generation apparatus 113, a three-dimensional shape storage apparatus 114, and an information processing apparatus 100. Moreover, the image processing system 1 includes a virtual viewpoint image generation apparatus 130, an image display apparatus 140, and an input apparatus 120.

The image capturing apparatuses 111 are each a digital video camera including an image signal interface typified by, for example, serial digital interface (SDI). The image capturing apparatuses 111 of the present embodiment output captured image data to the silhouette image extracting apparatuses 112 via a video signal interface.

Figure 1B:
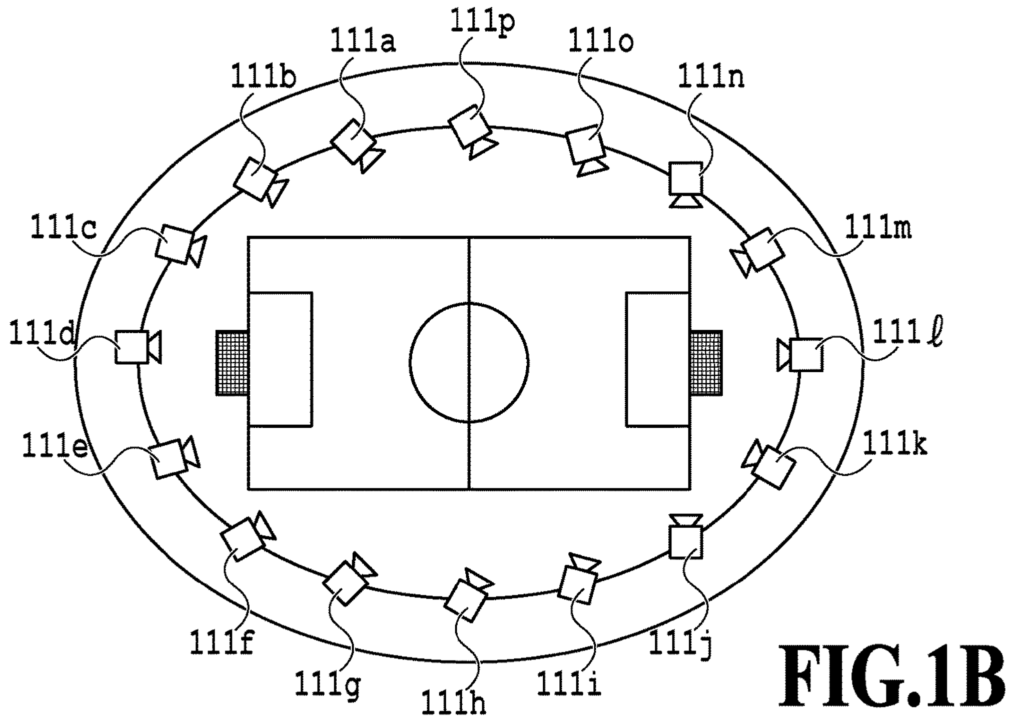

FIG. 1B is a plane view in which arrangement of the multiple image capturing apparatuses 111 is viewed from directly above a space (image capturing space) being an image capturing target of the multiple image capturing apparatuses 111. As illustrated in FIG. 1B, the image capturing apparatuses 111 include, for example, image capturing apparatuses 111*a* to 111*p*, are arranged around a field in which a game of soccer or the like is to be played, and time-synchronously capture images of objects such as players, a ball, and the like from various angles.

The silhouette image extracting apparatuses 112 are image processing apparatuses corresponding to the respective image capturing apparatuses 111. The captured images obtained as a result of image capturing by the image capturing apparatuses 111 corresponding to the silhouette image extracting apparatuses 112 are inputted into the respective silhouette image extracting apparatuses 112. The silhouette image extracting apparatuses 112 perform image processing on the inputted captured images. The image processing performed by the silhouette image extracting apparatuses 112 includes processing of extracting foreground regions depicting silhouettes of objects included in the inputted captured images. Then, the silhouette image extracting apparatuses 112 generate silhouette images in which the foreground regions that are included in the captured images and background regions that are regions other than the foreground regions are indicated by binary values. Moreover, the silhouette image extracting apparatuses 112 generate texture information of the objects that are image data corresponding to the silhouettes of the objects.

The objects expressed as foregrounds in the captured images are subjects that can be viewed from the virtual viewpoint, and refer to, for example, human figures (players) present on a field of a stadium. Moreover, the objects may be objects whose image patterns are determined in advance such as a ball, goals, and the like.

Methods of extracting the foreground from each captured image includes a method using background subtraction information. This method is a method as follows. For example, an environment space with no objects is captured and held in advance as a background image. Then, a region in which a differential value between a pixel value of the captured image and a pixel value of the background image is larger than a threshold is determined as the foreground. Note that the method of extracting the foreground is not limited to the method using the background subtraction information. Alternatively, a method using parallax, a method using a feature amount, a method using machine learning, or the like may be used as the method of extracting the foreground. The generated silhouette images and the texture information are outputted to the three-dimensional shape generation apparatus 113.

Note that, in the present embodiment, the silhouette image extracting apparatuses 112 and the image capturing apparatuses 111 are explained as separate apparatuses, but may be implemented as integrated apparatuses or apparatuses that are varied depending on functions.

The three-dimensional shape generation apparatus 113 is an image processing apparatus that is implemented by a computer such as a PC, a workstation, or a server. The three-dimensional shape generation apparatus 113 obtains the silhouette images based on the captured images (frames) obtained as a result of capturing images of visual field boundaries different from one another, from the silhouette image extracting apparatuses 112. The three-dimensional shape generation apparatus 113 generates data expressing three-dimensional shape of each object (referred to as three-dimensional shape data or three-dimensional model) included in the image capturing space based on the silhouette images.

A shape from silhouette that is generally used can be given as an example of a method of generating the three-dimensional model. The shape from silhouette is a method in which silhouette images corresponding to multiple image capturing apparatuses are back-projected to a three-dimensional space and an intersecting portion of a shape from silhouette derived from the silhouette images is calculated to obtain three-dimensional shape information of the object. The generated three-dimensional model is expressed as a set of voxels in the three-dimensional space.

The three-dimensional shape storage apparatus 114 is an apparatus that stores the three-dimensional models and the texture information. The three-dimensional shape storage apparatus 114 is a storage apparatus that includes a hard disk drive or the like that can store the three-dimensional models and texture information. The three-dimensional models and the texture information are stored in the three-dimensional shape storage apparatus 114 in association with time code information indicating information on image capturing time. Moreover, the three-dimensional shape generation apparatus 113 may directly output data to the information processing apparatus 100. In this case, the image processing system 1 may be configured to include no three-dimensional shape storage apparatus 114.

The information processing apparatus 100 is connected to the three-dimensional shape storage apparatus 114. Moreover, the information processing apparatus 100 is connected to the virtual viewpoint image generation apparatus 130. The information processing apparatus 100 reads out the three-dimensional models and the texture information stored in the three-dimensional shape storage apparatus 114, appends object identification information to the three-dimensional models and the texture information, and outputs the three-dimensional models and the texture information to the virtual viewpoint image generation apparatus 130. Details of processing of the information processing apparatus 100 are described later.

The virtual viewpoint image generation apparatus 130 is connected to the input apparatus 120 that receives instructions on a position of the virtual viewpoint and the like from a viewer. Moreover, the virtual viewpoint image generation apparatus 130 is connected to the image display apparatus 140 that displays the virtual viewpoint image to the viewer.

The virtual viewpoint image generation apparatus 130 is an image processing apparatus that has a function of generating the virtual viewpoint images and that is implemented by a computer such as a PC, a workstation, or a server. The virtual viewpoint image generation apparatus 130 generates the virtual viewpoint image expressing a view from the virtual viewpoint by performing rendering processing of projecting a texture based on the texture information on the three-dimensional models, based on information on the virtual viewpoint received via the input apparatus 120. The virtual viewpoint image generation apparatus 130 outputs the generated virtual viewpoint image to the image display apparatus 140.

The virtual viewpoint image generation apparatus 130 may receive three-dimensional position information and the object identification information of each object from the information processing apparatus 100, and display information based on the object identification information generated by the information processing apparatus 100. For example, the virtual viewpoint image generation apparatus 130 may render information such as a player name based on the object identification information for each object, and superimpose the information on the virtual viewpoint image.

The image display apparatus 140 is a display apparatus typified by a liquid crystal display or the like. The virtual viewpoint image generated by the virtual viewpoint image generation apparatus 130 is displayed on the image display apparatus 140, and is viewed by the viewer.

The input apparatus 120 is an apparatus that includes a controller such as a joy stick or a switch and into which a user inputs the viewpoint information of the virtual viewpoint. The viewpoint information received by the input apparatus 120 is transmitted to the virtual viewpoint image generation apparatus 130. The viewer can designate the position and the direction of the virtual viewpoint by using the input apparatus 120 while viewing the virtual viewpoint image generated by the virtual viewpoint image generation apparatus 130 via the image display apparatus 140.

[Functional Configuration of Information Processing Apparatus 100]

Next, a functional configuration of the information processing apparatus 100 in the present embodiment is explained by using FIG. 1A. The information processing apparatus 100 includes a three-dimensional information obtaining unit 101, an object coordinate obtaining unit 102, an object feature obtaining unit 103, and an object identification unit 104, and an object identification information management unit 105.

The three-dimensional information obtaining unit 101 has a function of reading out the three-dimensional model and the texture information of each object in a target frame for generating the virtual viewpoint image from the three-dimensional shape storage apparatus 114 and obtaining the read-out data. The three-dimensional information obtaining unit 101 outputs the read-out three-dimensional model and texture information to the object coordinate obtaining unit 102, the object feature obtaining unit 103, and the object identification unit 104 to be described later.

The object coordinate obtaining unit 102 identifies coordinates of each object from the three-dimensional model of the object obtained by the three-dimensional information obtaining unit 101, and obtains the coordinate information of the object as position information. A feature of the position of the object identified by the position information is referred to as first type of feature. The object coordinate obtaining unit 102 notifies the object identification unit 104 of the position information of the object.

The object feature obtaining unit 103 obtains information on multiple types of features different from the feature of position, for each of the objects that are targets of three-dimensional model generation. In the present embodiment, three pieces of information corresponding to three types of features of volume, color, and character of the object are obtained as the information on the multiple types of features of the object. The three types of features of volume, color, and character of the object are referred to as second type of feature. Moreover, description of simply feature means the second type of feature. Details of a method of obtaining the information on the feature of the object are described later.

The object identification unit 104 determines a type of feature that differs between the target objects, from among the multiple types of features of the objects obtained by the object feature obtaining unit 103. Then, the object identification unit 104 identifies the objects based on at least one of the position information of the objects obtained by the object coordinate obtaining unit 102 and the determined type of feature. Identification of the objects is identifying which one of objects in a frame other than the current frame corresponds to a certain object in the current frame, and multiple objects can be identified, for example, in the case where a distance between the objects is equal to or more than a threshold.

Then, the object identification information expressing a result of identification of the objects is generated. The object identification information is described later. Moreover, the object identification unit 104 may read out the object identification information of a previous frame from the object identification information management unit 105, and use the object identification information to identify the objects in the current frame in detail. For example, an object in a current frame identified to correspond to an object identified as a player A in the previous frame may be identified as the player A. The object identification unit 104 outputs the object identification information to the object identification information management unit 105.

The object identification information management unit 105 saves the object identification information in a storage unit typified by a hard disk drive or the like, and manages the object identification information.

In the present embodiment, the type of feature that differs between multiple objects and that enables identification of the multiple objects is determined before crossing of the multiple objects based on the position information of the multiple objects. The multiple objects can be thereby re-identified after the crossing at a small computation amount. Details are described later.

[Hardware Configuration]

Figure 2:
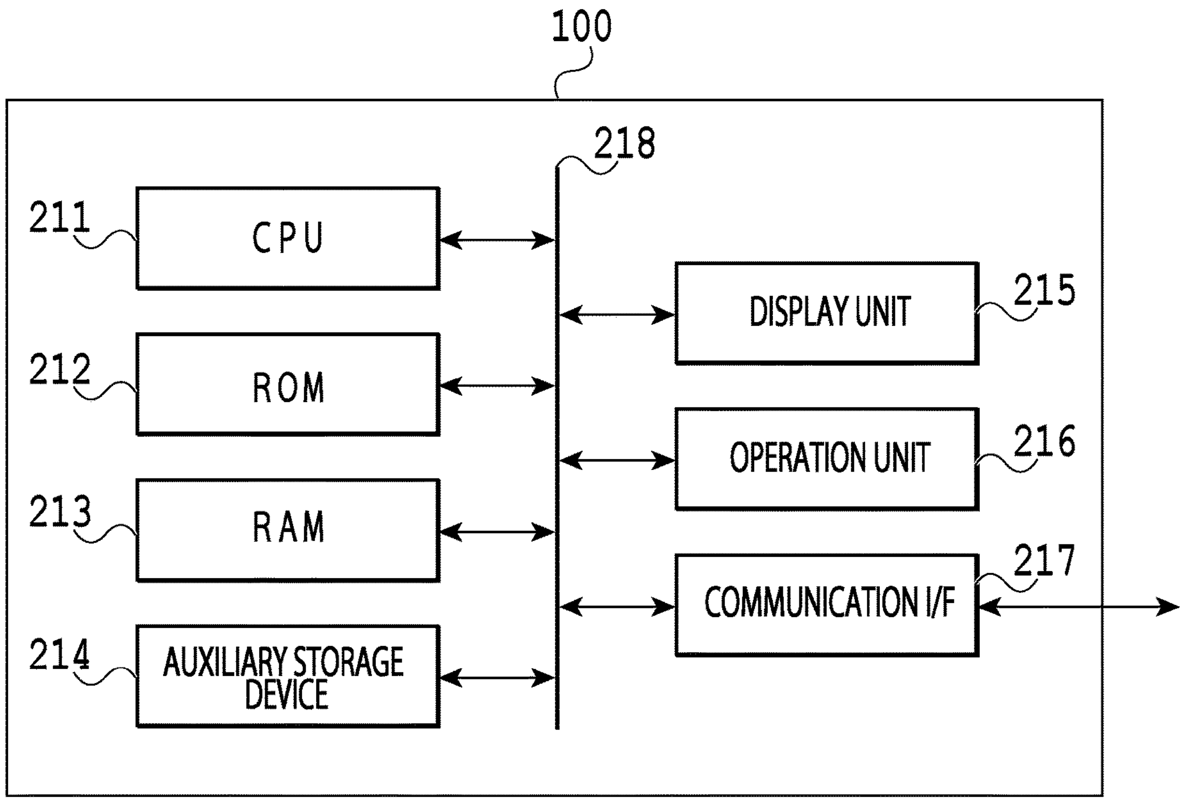
FIG. 2 is a block diagram illustrating a hardware configuration of an information processing apparatus.

FIG. 2 is a diagram illustrating a hardware configuration of the information processing apparatus 100. Note that hardware configurations of the silhouette image extracting apparatuses 112, the three-dimensional shape generation apparatus 113, and the virtual viewpoint image generation apparatus 130 are the same as the configuration of the information processing apparatus 100 explained below.

The information processing apparatus 100 includes a CPU 211, a ROM 212, a RAM 213, an auxiliary storage device 214, a display unit 215, an operation unit 216, a communication I/F 217, and a bus 218.

The CPU 211 controls the entire information processing apparatus 100 by using a computer program and data stored in the ROM 212 and the RAM 213 to implement functional units included in the apparatus. Note that the information processing apparatus 100 may include one or multiple pieces of dedicated hardware different from the CPU 211, and the dedicated hardware may at least partially execute processing of the CPU 211. Examples of the dedicated hardware include an ASIC (application specific integrated circuit), a FPGA (field programmable gate array), a DSP (digital signal processor), and the like.

The ROM 212 stores a program that does not have to be changed. The RAM 213 temporarily stores a program and data supplied from the auxiliary storage device 214, data supplied from the outside via the communication I/F 217, and the like. The auxiliary storage device 214 is formed of, for example, a hard disk drive or the like, and stores various types of data such as image data and audio data.

The display unit 215 is formed of, for example, a liquid crystal display, an LED, or the like, and displays a GUI (graphical user interface) used by the user to operate the information processing apparatus 100 and the like. The operation unit 216 is formed of, for example, a keyboard, a mouse, a joystick, a touch panel, and the like, and inputs various instruction into the CPU 211 by receiving operations made by the user. The CPU 211 operates as a display control unit that controls the display unit 215 and an operation control unit that controls the operation unit 216. In the present embodiment, explanation is given assuming that the display unit 215 and the operation unit 216 are present inside the information processing apparatus 100. However, at least one of the display unit 215 and the operation unit 216 may be present outside the information processing apparatus 100 as a separate apparatus.

The communication I/F 217 is used for communication of the information processing apparatus 100 with an external apparatus. For example, in the case where the information processing apparatus 100 is connected to the external apparatus by wire, a communication cable is connected to the communication I/F 217. In the case where the information processing apparatus 100 has a function of performing wireless communication with the external apparatus, the communication I/F 217 includes an antenna. The bus 218 transmits information by connecting the units of the information processing apparatus 100 to one another.

The CPU 211 of the information processing apparatus 100 executes a predetermined program to implement the functional units in the information processing apparatus 100 of FIG. 1A, but the present embodiment is not limited to this. For example, hardware such as a GPU (graphics processing unit) or a FPGA (field programmable gate array) may also be used to increase speed of computation. Each functional unit may be implemented by cooperation of software and hardware such as a dedicated IC, or one or all of the functions may be implemented only by hardware.

[Regarding Generation of Three-Dimensional Models]

Figure 3:
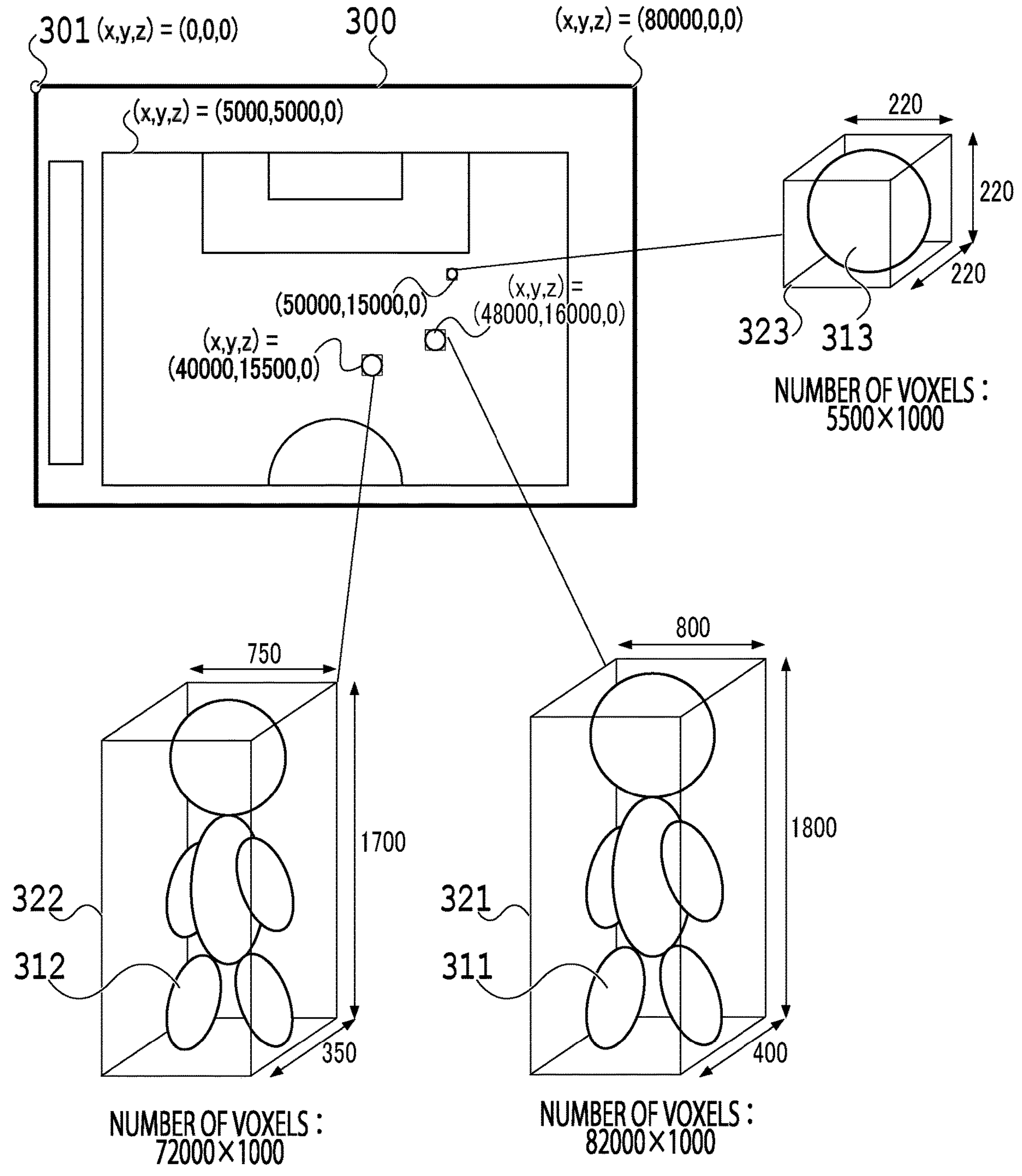
FIG. 3 is a diagram illustrating examples of three-dimensional models of objects and position information of the objects.

FIG. 3 is a diagram for explaining the three-dimensional models of the objects. The objects that are the targets of three-dimensional model generation in FIG. 3 are players playing a game of soccer and a ball that are included in a soccer field being the image capturing space. For the sake of convenience of explanation, the three-dimensional models are explained assuming that two players and a soccer ball are present on the field.

First, in order to generate the three-dimensional models, the image capturing apparatuses 111 capture images of subjects (objects) such as the soccer players and the soccer ball from multiple different directions. The image capturing apparatuses 111 arranged around the soccer field capture the images of the objects at an identical timing. Next, the silhouette image extracting apparatuses 112 separate the regions of the objects in the captured images from the background regions that are regions other than the objects, and extract the silhouette images expressing the regions of objects. Then, the three-dimensional shape generation apparatus 113 generates the three-dimensional models of the objects from the silhouette images of multiple different viewpoints by using a method such as a shape from silhouette.

A three-dimensional space 300 illustrated in FIG. 3 illustrates a state where the field being the image capturing space is viewed from above. Coordinates 301 in FIG. 3 are coordinates (0, 0, 0) indicating the origin. Three-dimensional shapes of three-dimensional models of objects 311 and 312 that are the soccer players on the field and an object 313 that is the soccer ball are expressed by, for example, sets of voxels (voxel groups) that are fine cuboids. For example, in the three-dimensional models of the objects 311 to 313 of the soccer players and the soccer ball, three-dimensional shapes at a moment (one frame) of image capturing by the image capturing apparatuses 111 are expressed by the voxels.

In the present embodiment, explanation is given assuming that the volume of one voxel is one cubic millimeter. Accordingly, the three-dimensional shape model of the object 313 of the soccer ball that has a diameter of 22 centimeters in FIG. 3 is generated as a spherical voxel group that has a radius of 110 voxels and that is surrounded by a cuboid of 220×220×220 mm. Similarly, the three-dimensional models of the objects 311 and 312 of the soccer players are also generated as voxels.

The three-dimensional models in which the three-dimensional shapes are expressed by the voxels and the not-illustrated texture information are stored in the three-dimensional shape storage apparatus 114. The three-dimensional models and the texture information corresponding to each frame of the moving image obtained by capturing an image of a soccer game are stored by repeating this processing for each frame. The three-dimensional information obtaining unit 101 of the information processing apparatus 100 reads the three-dimensional models, and outputs the three-dimensional models to the object coordinate obtaining unit 102, the object feature obtaining unit 103, and the object identification unit 104.

[Regarding Method of Obtaining Position Information of Objects]

The object coordinate obtaining unit 102 identifies the coordinates of the objects that are the targets of three-dimensional model generation from the three-dimensional models to obtain the coordinates as the position information of the objects. For example, the coordinates of the objects 311 to 313 of the soccer players and the soccer ball illustrated in FIG. 3 are obtained.

For example, the coordinates of each object are identified by using a cuboid (referred to as bounding box) circumscribing the voxel group expressing the three-dimensional shape of the object. Coordinates of each of eight vertices of the bounding box can be calculated as described below from the maximum coordinate value (max) and the minimum coordinate value (min) in each of X, Y, and Z axes of the voxel group expressing the three-dimensional shape of the object.

Vertex 1 (Xmin, Ymin, Zmin)
Vertex 2 (Xmax, Ymin, Zmin)
Vertex 3 (Xmin, Ymax, Zmin)
Vertex 4 (Xmax, Ymax, Zmin)
Vertex 5 (Xmin, Ymin, Zmax)
Vertex 6 (Xmax, Ymin, Zmax)
Vertex 7 (Xmin, Ymax, Zmax)
Vertex 8 (Xmax, Ymax, Zmax)

The configuration may be such that coordinates of the center of gravity of the object are obtained from the coordinates of the eight vertices forming the bounding box of the object, and the coordinates of the center of gravity are obtained as the coordinates of this object. Alternatively, the coordinates of one of the eight vertices of the bounding box may be obtained as the coordinates of the object. In the present embodiment, explanation is given assuming that the coordinates of one of the eight vertices forming the bounding box that is closest to the origin are obtained as the coordinates of the object.

For the object 313 of the soccer ball illustrated in FIG. 3, the coordinates of the vertex of the bounding box 323 that is close to the origin is (X, Y, Z)=(50000, 15000, 0).

The object coordinate obtaining unit 102 can thus identify the position of the object by obtaining the coordinates of the object 313 of the soccer ball. The object coordinate obtaining unit 102 can similarly obtain the coordinates of the objects 311 and 312 of the soccer players from the bounding boxes 321 and 322.

[Regarding Method of Tracking Based on Coordinate Information]

Figure 4A:
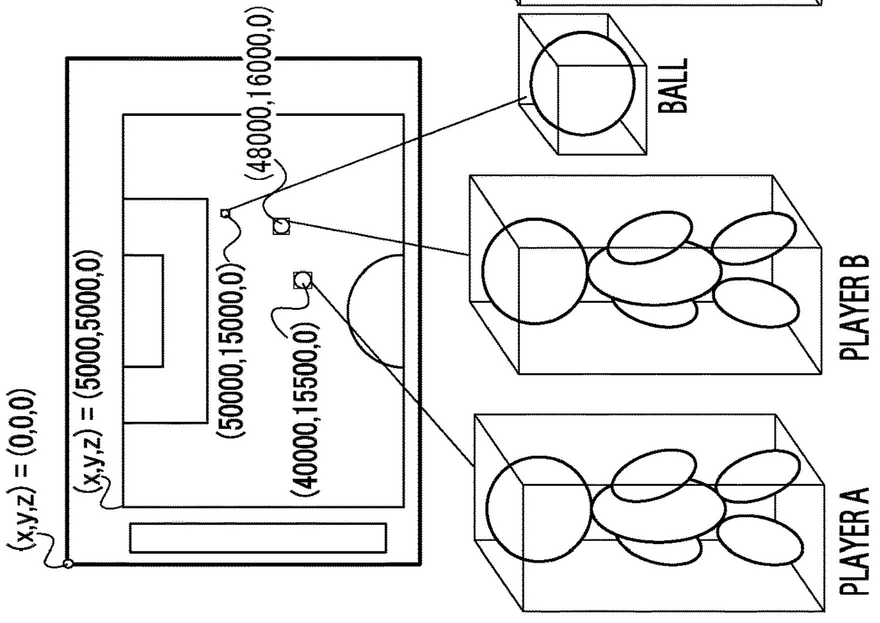
FIGS. 4A to 4C are diagrams for explaining a method of identifying the objects by using coordinate information.
Figure 4B:
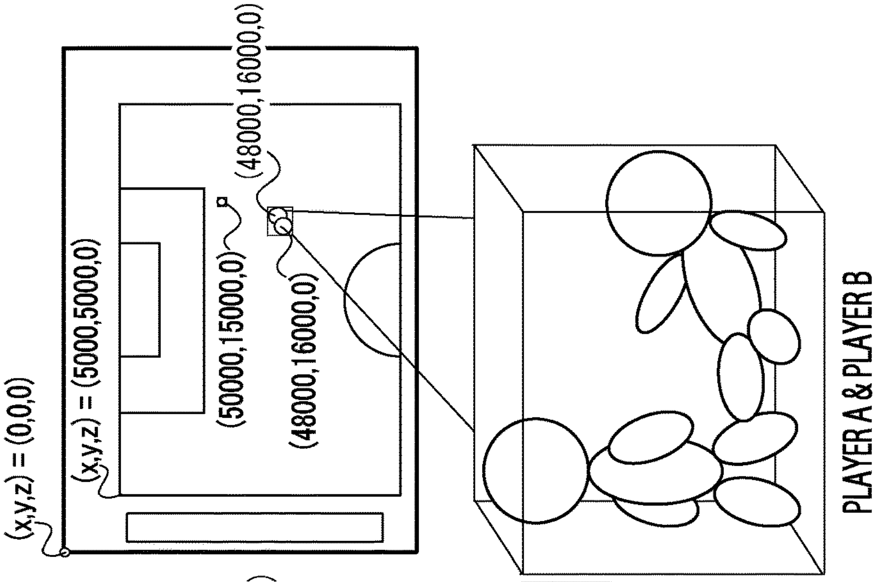
Figure 4C:
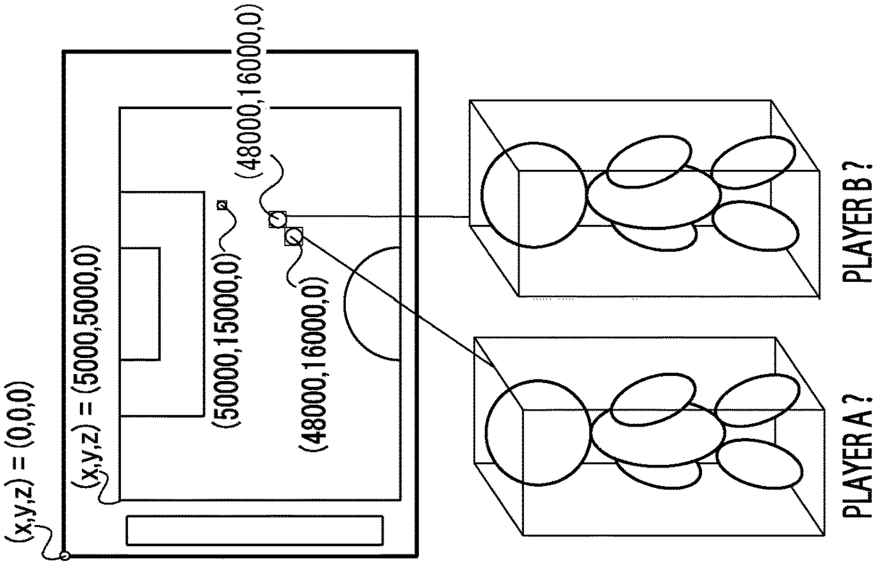

FIGS. 4A to 4C are diagrams for explaining a comparative example of a method of identifying multiple objects that are the targets of three-dimensional model generation. In this section, explanation is given of a method of identifying the objects based on transition of the coordinates of the objects.

FIG. 4A is the same drawing as FIG. 3, and it is assumed that one of the two objects on the field is associated with the player A and the other is associated with the player B. Which object is the player A and which object is the player B in a frame after time lapse are identified from transition of the coordinates of the objects in previous and following frames in the case where a distance between the multiple objects is sufficiently large. For example, the coordinates of each object are obtained, and an object whose distance from a position of an object in the previous frame is smallest is identified. Thus, which object, that is which of the player A and the player B each object in the current frame is can be identified and distinguished. For example, in the case where a frame rate is 60 fps, the object identification unit 104 identifies the objects by obtaining the coordinates every one frame, that is every 16.6 milliseconds. Since multiple objects that are located sufficiently away from each other in the previous frame do not switch positions in a short period of 16.6 milliseconds, the objects can be identified based on the transition of coordinates in a predetermined time width.

FIG. 4B is a diagram illustrating the three-dimensional models generated from images captured at different time from that of FIG. 4A and the positions of the objects identified from the three-dimensional models. As illustrated in FIG. 4B, in a state where the distance between the multiple objects becomes smaller than a threshold and the multiple objects are in an overlapping (crossing) state, only one bounding box corresponding to the two objects is recognized. In this case, the positions of the player A and the player B that are the two objects are obtained as the same position.

FIG. 4C is a diagram illustrating the three-dimensional models generated from captured images corresponding to a frame following FIG. 4B and the coordinates of the objects. In the case where the crossing two objects move away from each other, the bounding boxes are recognized such that the two objects are included in separate bounding boxes again. However, the crossing (overlapping) objects are obtained to be at the same position in the previous frame. Accordingly, which object, that is which of the player A and the player B each of the object in the current frame is cannot be identified even if the transition of coordinates is compared.

Accordingly, in the present embodiment, explanation is given of a method of appropriately identifying multiple objects also after crossing of the multiple objects.

[Regarding Method of Obtaining Information on Volume as Feature of Object]

In the present embodiment, the object feature obtaining unit 103 obtains information on the multiple types of features for each of the multiple objects that are the targets of three-dimensional model generation. In the present embodiment, as described above, the three pieces of information corresponding to the three types of features of volume, color, and character are obtained as the information on the multiple types of features. A method of obtaining the information on the volume that is the first type of feature of the object is explained by using FIG. 3.

The object feature obtaining unit 103 obtains information on the volume of each object by deriving, from the three-dimensional model of the object, the number of voxels forming the three-dimensional shape. The reason for using the number of voxels as the information on the volume is because, ideally, the number of voxels forming the three-dimensional shape is proportional to the volume of the actual object.

For example, in the case where the weight of the soccer player who is the object 311 is 80 kg, the volume of the soccer player is about 82,000 $cm^3$ assuming that the specific weight of human is 0.97. As described above, the voxel size of one voxel is 1×1×1 mm. Accordingly, the number of voxels for expressing the three-dimensional shape of the object 311 that is the soccer player with a weight of 80 kg is about $82{,}000\times10^3$. Specifically, in the case where the silhouette image extracting apparatuses 112 appropriately extracts the silhouette images of the object 311 of the player and the three-dimensional shape generation apparatus 113 appropriately generates the three-dimensional model of the object 311, the number of voxels is derived to be about $82{,}000\times10^3$.

Methods of deriving the number of voxels include, for example, a method of counting the number of voxels expressing the three-dimensional shape in the bounding box of the target object. For example, in the case of the object 311 of the soccer player in FIG. 3, the number of voxels in the bounding box 321 may be counted. Specifically, the object feature obtaining unit 103 can derive the number of voxels forming the three-dimensional shape of the object by counting the number of voxels included in the cuboid having the eight vertices forming the bounding box 321.

In the case where the three-dimensional model of the object 311 of the soccer player is appropriately generated, the object feature obtaining unit 103 counts the number of voxels forming the three-dimensional shape of the object 311 illustrated in FIG. 3 to be $82{,}000\times10^3$.

Moreover, the object 312 is assumed to be a player with a smaller body build than the object 311. For example, in the case where the weight of the object 312 that is the soccer player is 70 kg, the number of voxels forming the three-dimensional shape of the object 312 is counted to be about $72{,}000\times10^3$ if the counting is performed similarly. In comparison of the number of voxels of the object 311 of the soccer player to that of the object 312 of the soccer player, the numbers vary from each other by more than 10%. Moreover, since the numbers of voxels are proportional to the volumes of the objects, the numbers of voxels do not change abruptly depending on the postures of the players or the like. Accordingly, objects of multiple human figures who vary in body-build can be identified by comparing the numbers of voxels that are the information on the volumes.

Moreover, in the case where the object 313 is the soccer ball, the number of voxels expressing the three-dimensional shape is counted to be about $5{,}500\times10^3$ by a method of calculating the volume of a sphere. Whether the object is the ball or the player can be identified by comparing the numbers of voxels.

Moreover, the volume of the bounding box circumscribing the voxel group forming the three-dimensional shape of the object may be obtained as the information on the volume of the object. Particularly, in the case where the sizes of the objects are different as in the case of the player and the soccer ball, the objects can be identified by comparing the volumes of the bounding boxes instead of comparing the numbers of voxels forming the three-dimensional shapes. The volume of the bounding box is proportional to the volume of the object, and can be the feature that relates to the volume and that is used to identify the object.

The volume of the bounding box 321 of the object 311 of the player in FIG. 3 can be calculated from the following formula $800\times400\times1{,}800=576{,}000\times10^3$ mm$^3$ to be $576{,}000\times10^3$ mm$^3$.

Meanwhile, the volume of the bounding box 323 of the object 313 of the soccer ball can be calculated from the following formula $220\times220\times220=10{,}648\times10^3$ mm$^3$ to be $10{,}648\times10^3$ mm$^3$.

In the case of a human figure such as the player, the volume of the bounding box may change depending on the posture of the player. However, a difference is observed between the volume of the bounding box of the ball and the volume of the bounding box of the player no matter what the posture of the player is. In the case of identifying whether the object is the player or the ball, the volumes of the bounding boxes may be obtained as the information relating to the volumes of the objects instead of the numbers of voxels.

[Regarding Method of Obtaining Color Information as Feature of Object]

FIGS. 5A to 5E are diagrams illustrating examples of the texture information and color histograms corresponding to each object. A method of obtaining information (color information) on the color of the object as the information corresponding to the second type of feature of the object is explained by using FIG. 5. In the present embodiment, explanation is given of a method in which the color histograms are generated from the texture information corresponding to the object, and a representative color of the object is obtained as the color information.

Figure 5A:
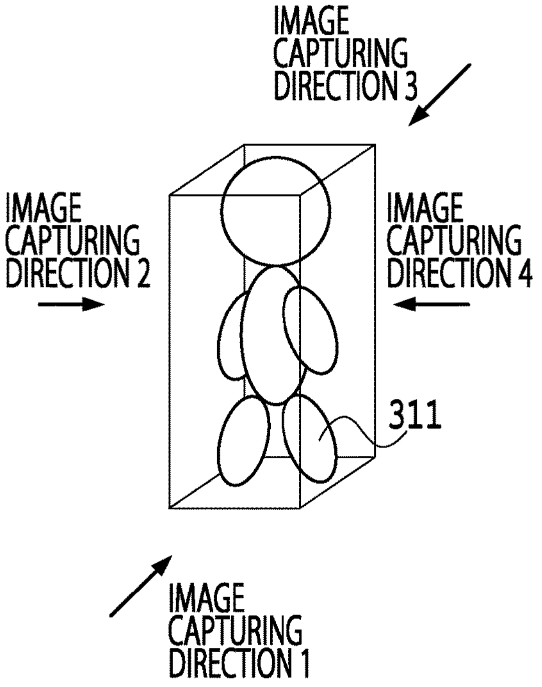
FIGS. 5A to 5E are diagrams for explaining an example of color information of the object.

FIG. 5A is a diagram illustrating image capturing directions of the image capturing apparatuses 111 capturing images of the soccer player who is the object 311. Multiple image capturing apparatuses 111 are installed to surround the periphery of the object, and each of the captured images obtained by the image capturing by the respective image capturing apparatuses 111 includes the texture information of the object. In the present embodiment, the images of the object 311 that is the soccer player are assumed to be captured from four image capturing directions 1 to 4 to simplify the explanation. In this case, four pieces of texture information are obtained from the captured images obtained by the image capturing from the four image capturing directions 1 to 4 illustrated in FIG. 5A.

Figure 5B:
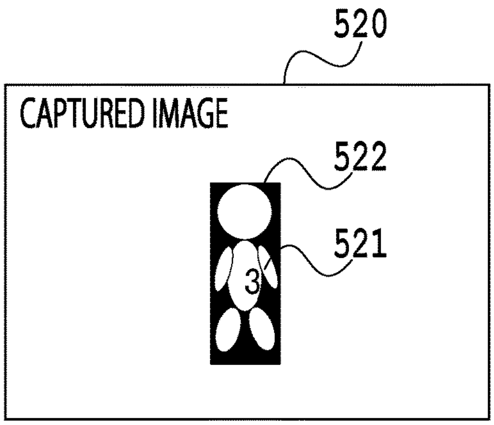

FIG. 5B is a diagram illustrating a captured image 520 obtained by the image capturing from the image capturing direction 1 among the image capturing directions 1 to 4. Image data in a region 522 including the object in the captured image 520 is texture information 521 of the object 311 that is the soccer player. The region 522 including the object is derived from the captured image obtained by the image capturing from the image capturing direction 1, by projecting a three-dimensional position of the object on the field to image coordinates of the image capturing apparatus 111 that has performed the image capturing from the image capturing direction 1. This texture information 521 is obtained by extracting image data from the derived region 522.

The object feature obtaining unit 103 generates the histogram for each of colors of R, G, and B from the texture information 521 illustrated in FIG. 5B. The object feature obtaining unit 103 excludes texture of the background region (black region in FIG. 5B) that is the region other than the object region in the region 522, from a range of obtaining luminance values for generation of the color histograms. The object feature obtaining unit 103 can determine whether a region is the object region or the background region by using the silhouette images extracted by the silhouette image extracting apparatuses 112.

Figure 5C:
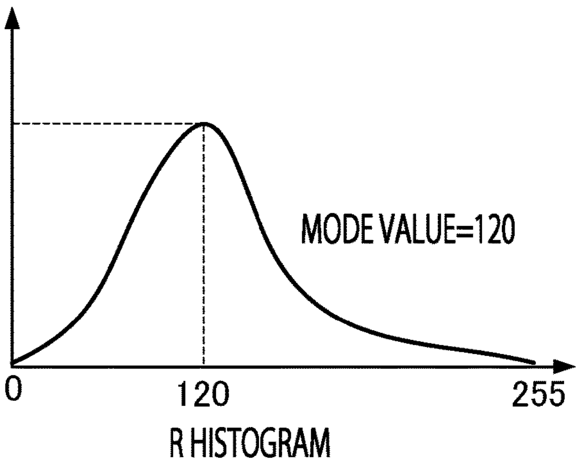
Figure 5D:
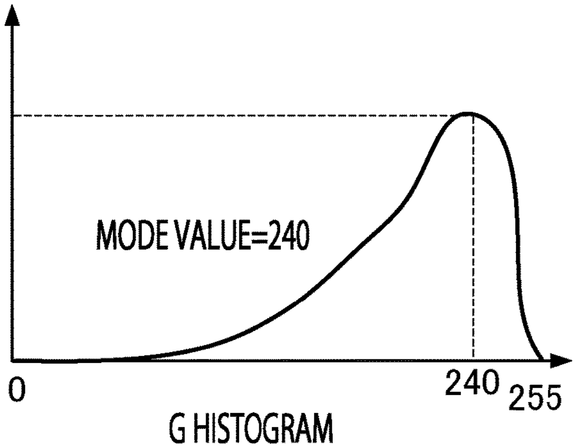
Figure 5E:
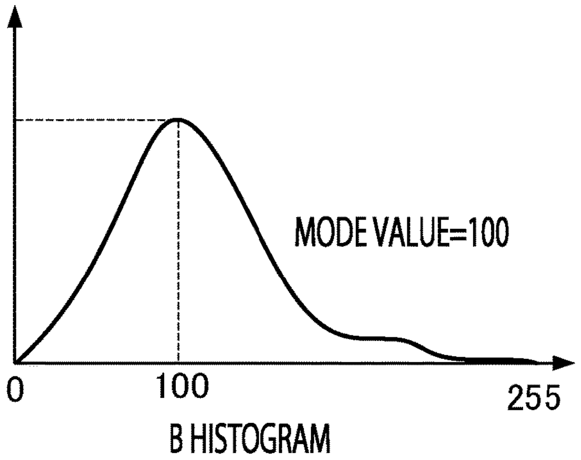

FIGS. 5C, 5D, and 5E are graphs illustrating the histograms of the respective colors of R, G, and B generated by the object feature obtaining unit 103. The horizontal axis of each graph represents the luminance value of a pixel, and the vertical axis represents the number of pixels. In the present embodiment, the luminance value of each color is assumed to be an 8-bit value in a value range of 0 to 255. The luminance value that is the mode value in each of the colors of R, G, and B is determined from the histogram of the corresponding color.

The histogram of red (R) in FIG. 5C illustrates that the mode value is determined to be 120. The histogram of green (G) in FIG. 5D illustrates that the mode value is determined to be 240. The histogram of blue (B) in FIG. 5E illustrates that the mode value is determined to be 100.

The mode value in the histogram of each color expresses a feature of, for example, a uniform worn by the player. In comparison of the mode values in the histograms of FIGS. 5C, 5D, and 5E, the mode value of a green (G) component is the highest. Accordingly, the representative color of the object 311 can be determined to be green. For example, in the case where the player who is the object 311 is wearing a green uniform, green is determined as the representative color of the object 311.

In a game such as soccer, in the case where the teams are different, the representative colors of the uniforms are different. Accordingly, in the case where the soccer players are the objects, multiple objects that are players of different teams can be identified by using the information on the color of each object obtained by comparing the color histograms corresponding to the object.

Note that, although explanation is given assuming that the representative color is obtained as the information on the color, the information on the color of the object is not limited to the representative color.

Moreover, in the present embodiment, explanation is given of the method in which the information on the color (representative color) is obtained by using the histograms generated from the texture information in the captured image corresponding to one image capturing apparatus. Alternatively, the configuration may such that the representative color is determined based on the histograms generated from the texture information in multiple captured images corresponding to multiple image capturing apparatuses, and the object is identified based on the determined representative color. In the case where multiple captured images are used, the numbers of pixels in regions capturing the player in the respective captured images vary. Accordingly, the identification of the object may be performed by determining the representative color by generating histograms normalized based on the size of the texture information.

[Regarding Method of Obtaining Character Information as Feature of Object]

Figure 6A:
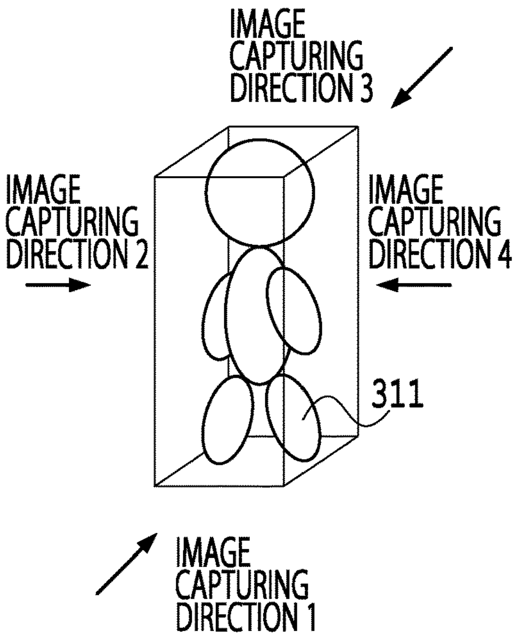
FIGS. 6A and 6B are diagrams for explaining an example of character information of the object.
Figure 6B:
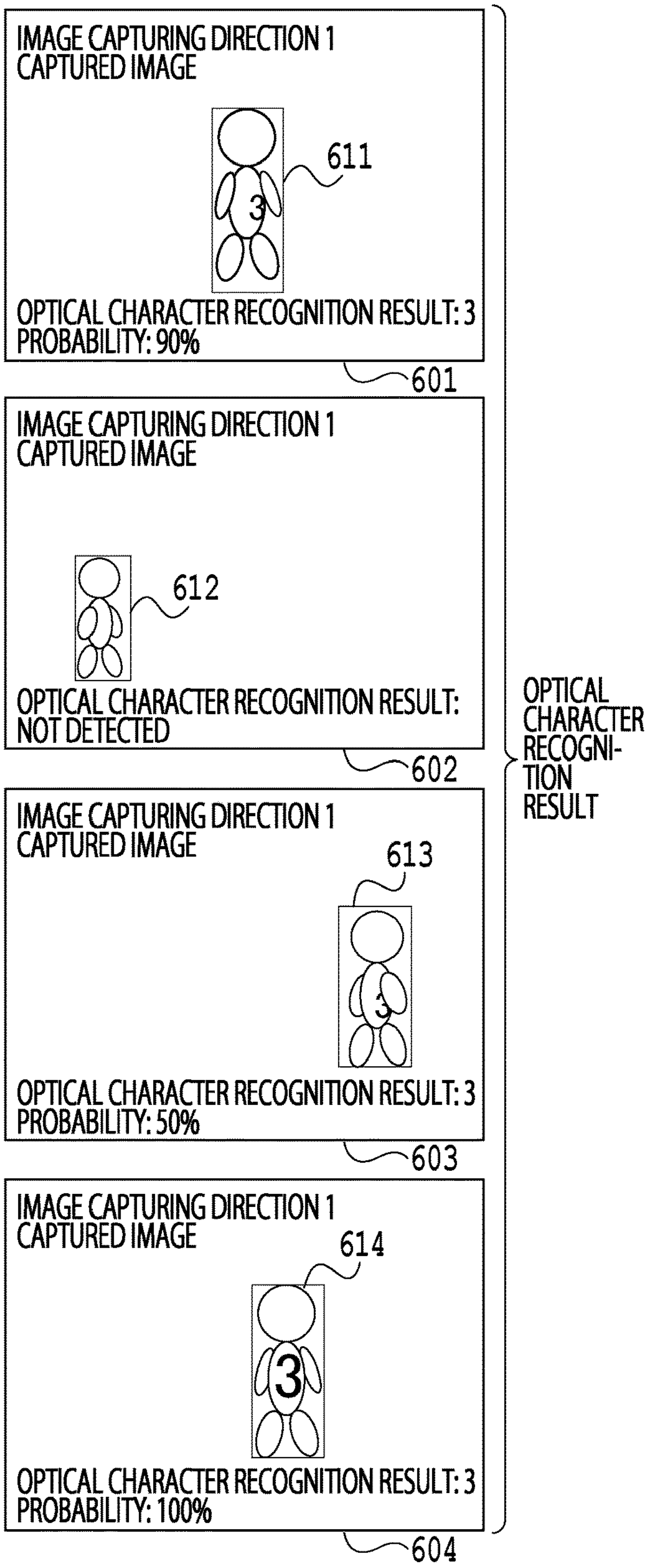

FIGS. 6A and 6B are diagrams illustrating an example of a method of obtaining a character included in each object. The method of obtaining information (character information) on the character included in the object as information corresponding to a third type of feature of the object is explained by using FIG. 6. In the present embodiment, a method of obtaining the character information from the texture information corresponding to the object is explained.

FIG. 6A is a diagram illustrating the image capturing directions of the image capturing apparatuses 111 capturing images of the soccer player who is the object 311 as in FIG. 5A. In FIG. 6, as in FIG. 5, explanation is given assuming that the images of the object 311 are captured from the four image capturing directions of 1 to 4.

FIG. 6B illustrates captured images 601 to 604 obtained by performing image capturing from the image capturing directions 1 to 4, respectively. The captured images 601 to 604 include pieces of texture information 611 to 614 corresponding to the object 311, respectively. Regions including the pieces of texture information 611 to 614 in the captured images are obtained by projecting the three-dimensional position of the object on the field onto the coordinates in the captured images as described above.

The object feature obtaining unit 103 performs character recognition processing using an optical character recognition technique on the pieces of texture information 611 to 614, and obtains character strings included in the pieces of texture information 611 to 614.

The texture information 611 in FIG. 6B includes "3" that is the uniform number on the uniform worn by the player who is the object 311. Accordingly, the object feature obtaining unit 103 obtains a character string expressing "3" by performing the character recognition processing on the texture information 611.

Meanwhile, there is a case where, even for the same object, the character string cannot be recognized from the texture information of the object depending on the image capturing direction. The captured image 602 is an image obtained by capturing the sideways image of the object 311, and no character string is recognized from the texture information 612 of the captured image 602.

Moreover, there is case where part of the character string is hidden by the hand of the object or the like as in the captured image 603, and recognition of part of the character string included in the texture information is difficult. Accordingly, information such as a probability or the like indicating a degree of accurateness of recognition of the character string recognized by the character recognition processing may be further obtained. As described above, the object feature obtaining unit 103 obtains the character string obtained by the character recognition processing from the texture information in the captured images obtained by the image capturing from various directions.

Moreover, the object feature obtaining unit 103 derives the character string of the uniform number for identifying the object, from the character string obtained from multiple pieces of texture information and the information on the probability of the character string, and obtains the character string expressing the uniform number as the information relating to the character of the object. In FIG. 6B, since the character string of "3" is obtained from the multiple captured images, the object feature obtaining unit 103 obtains the character information expressing that the uniform number of this object is "3".

In order to derive the character string of the uniform number from among character strings obtained by performing the character recognition processing on the texture information, the character string of the uniform number may be derived by using the fact that each character of the uniform number is displayed on the uniform in a larger size than the other character strings.

For example, in a sport game such as soccer, the uniform number is written on the uniform of each player. Generally, the players of the same team wear uniforms with uniform numbers that vary among the players. Accordingly, the multiple objects can be identified from one another by deriving the character strings of the uniform numbers from the character strings recognized from the texture information and comparing the character strings of the uniform numbers of the multiple objects.

Note that, although explanation is given assuming that the character string recognized from the texture information is the character string of the uniform number in the present embodiment, the configuration may be such that another character string is recognized, and the character string obtained as a result is obtained as the character information of the object. For example, since a player name is also written on the uniform, the object feature obtaining unit 103 may determine the name of the player by which the object is identifiable from the character strings obtained by performing the character recognition processing on the texture information, and obtain the name as the character information.

As described above, the object feature obtaining unit 103 has a function of obtaining the pieces of information on the volume, the color, and the character as the information expressing the feature of the object.

[Regarding Identification of Objects Using Information Corresponding to Feature]

Figure 7:
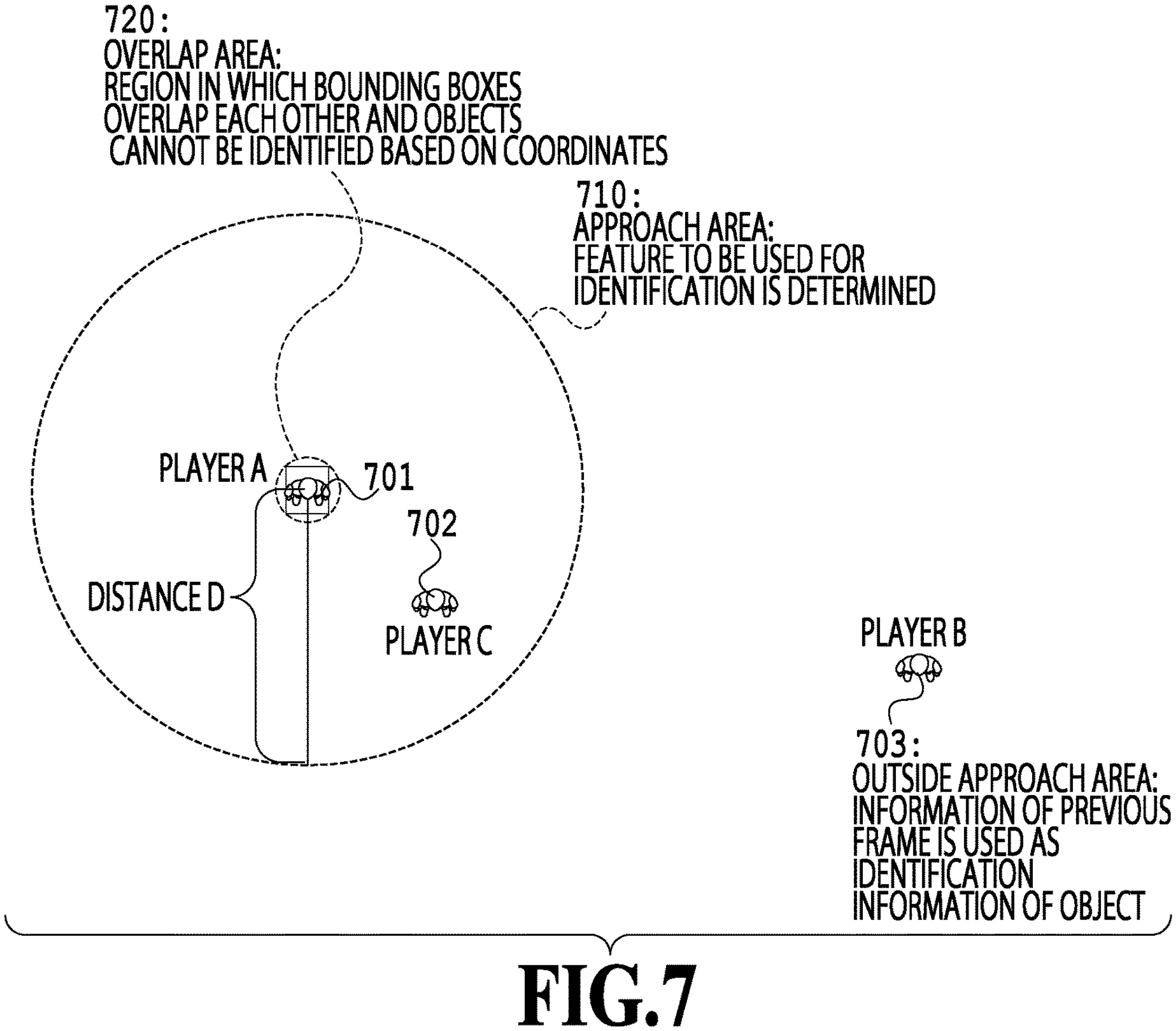
FIG. 7 is a diagram for explaining a distance state between the objects.

FIG. 7 is a diagram illustrating three-dimensional models of multiple objects in the image capturing space. FIG. 7 is a diagram in which soccer players who are objects 701 to 703 being the targets of three-dimensional model generation are viewed from overhead. The object identification unit 104 is explained by using FIG. 7. Explanation is given assuming that there are three objects (players) being the targets of three-dimensional model generation to simplify the explanation.

In the present embodiment, a range of distance D from an object is defined as an approach area. For example, in FIG. 7, the range of distance D from a certain player A who is the object 701 is defined as an approach area 710. The distance D is a distance set as a distance at which there is a possibility that objects cross each other in the next frame and bounding boxes overlap and become one.

On the other hand, in the case where the distance between the objects is larger than the distance D, the objects are determined to have no possibility of crossing each other in the next frame. Specifically, a player B who is the object 703 outside the approach area 710 is determined to have no possibility of crossing the player A who is the object 701 in the next frame.

Moreover, in the present embodiment, a range in which the bounding box of an object and the bounding box of another object cross each other and become one bounding box is defined as an overlap area 720. The overlap area 720 is an area having a radius equal to a threshold set based on a distance at which bounding boxes are recognized as one bounding box. Accordingly, in the case where the distance between multiple objects is smaller than the set threshold, the multiple objects are included in each other's overlap area 720.

For example, in the case of the object 701 in FIG. 7, a range of a circle in contact with the bounding box of the object 701 is set as the overlap area 720. As described above, in the case where the bounding boxes of the objects overlap each other and are recognized as one bounding box, the objects are in a state where they cannot be identified from each other based on the transition of coordinates, in the following frame.

Accordingly, in the present embodiment, in the case where the objects approach (cross) each other to enter each other's overlap areas and then move away from each other to go again into a state where the coordinates can be obtained separately for the objects, the objects are identified based on the information on the type of feature by which the objects can be identified, instead of the coordinate information. To this end, in the present embodiment, the object identification unit 104 determines in advance the type of feature by which the objects can be identified from among the above-mentioned multiple types, for the objects in the approach areas.

For example, in the case where the object 702 (player C) is in the approach area 710 of the object 701 (player A), there is a possibility of the objects 701 and 702 crossing each other in the next frame. Accordingly, there is a possibility that identification of which of the player A and the player C each of the objects 701 and 702 is based on the transition of coordinates becomes impossible within the following several frames. Accordingly, in the case where the objects are included in the approach area, the type of feature by which each of the objects in the approach area can be identified is determined from among the multiple types of features described above.

In FIG. 7, the object identification unit 104 causes the object feature obtaining unit 103 to obtain the information on the three types of features for each of the object 701 and the object 702. Specifically, in the present embodiment, the object feature obtaining unit 103 obtains the information on the volume, the information on the color (color information), and the information on the character (character information) as the information on the features of the object.

Then, the object identification unit 104 determines the type of feature that differs between the multiple objects in the approach area, from among the obtained three types of features.

Since there is a possibility that the objects 701 and 702 have the same uniform number, for example, in the case where the object 701 and the object 702 are the players of different teams, there may be no difference or little difference in the character information of the object 701 and the object 702 in some cases. However, the objects 701 and 702 wear different uniforms in the case where the object 701 and the object 702 are the players of different teams. Accordingly, there is a difference in the color information obtained from the texture information corresponding to the objects. Accordingly, the object identification unit 104 can determine the color information as the information on the type of feature with a difference by which the object 701 and the object 702 can be identified.

Meanwhile, the object 701 and the object 702 wear the same uniform in the case where the object 701 and the object 702 are the players of the same team. Accordingly, it is assumed that no difference is observed in the color information. However, since there are no players with the same uniform number in the same team, there is a difference in the character information. In this case, the object identification unit 104 can determine that the character information is the information on the type of feature with a difference by which the object 701 and the object 702 can be identified. Moreover, in the case where the body builds of the players differ greatly depending on positions such as in rugby, the information on the volume is determined as the information on the type of feature with a difference.

Moreover, since there is a difference in the volume also in the case where the object 701 and the object 702 in the approach area are the ball and the player, the information on the volume is determined as the information on the type of feature with a difference.

As described above, in the case where another object is included in the approach area, a parameter (feature) by which the objects can be identified is selected in advance from among the multiple candidates. Accordingly, even in the case where another object enters the overlap area and the objects cannot be identified based only on the coordinates, the objects can be re-identified by using the information determined in advance. Moreover, since the information with a difference is determined from the multiple pieces of information, the case where the objects cannot be identified can be suppressed.

Moreover, in cases other than the identification of the objects after the crossing, the object identification unit 104 identifies the objects based on the transition of coordinates without using the information expressing the feature as described above. For example, in FIG. 7, the object 703 (player B) is outside the approach area 710. In this case, the object identification unit 104 appends the object identification information identified in the previous frame based on the transition of the coordinates of the object 703. For example, in the case where the object 703 is the player B in the previous frame, the object 703 is identified as the player B also in the current frame.

In order to obtain the color information and the character information, image processing based on the texture information needs to be performed, and the image processing generally requires a certain computation load. In the present embodiment, the case where the objects are identified by using the information expressing the feature is limited to some cases. Accordingly, the objects can be identified with a computation amount suppressed.

[Flow of Processing of Identifying Objects]

Figure 8:
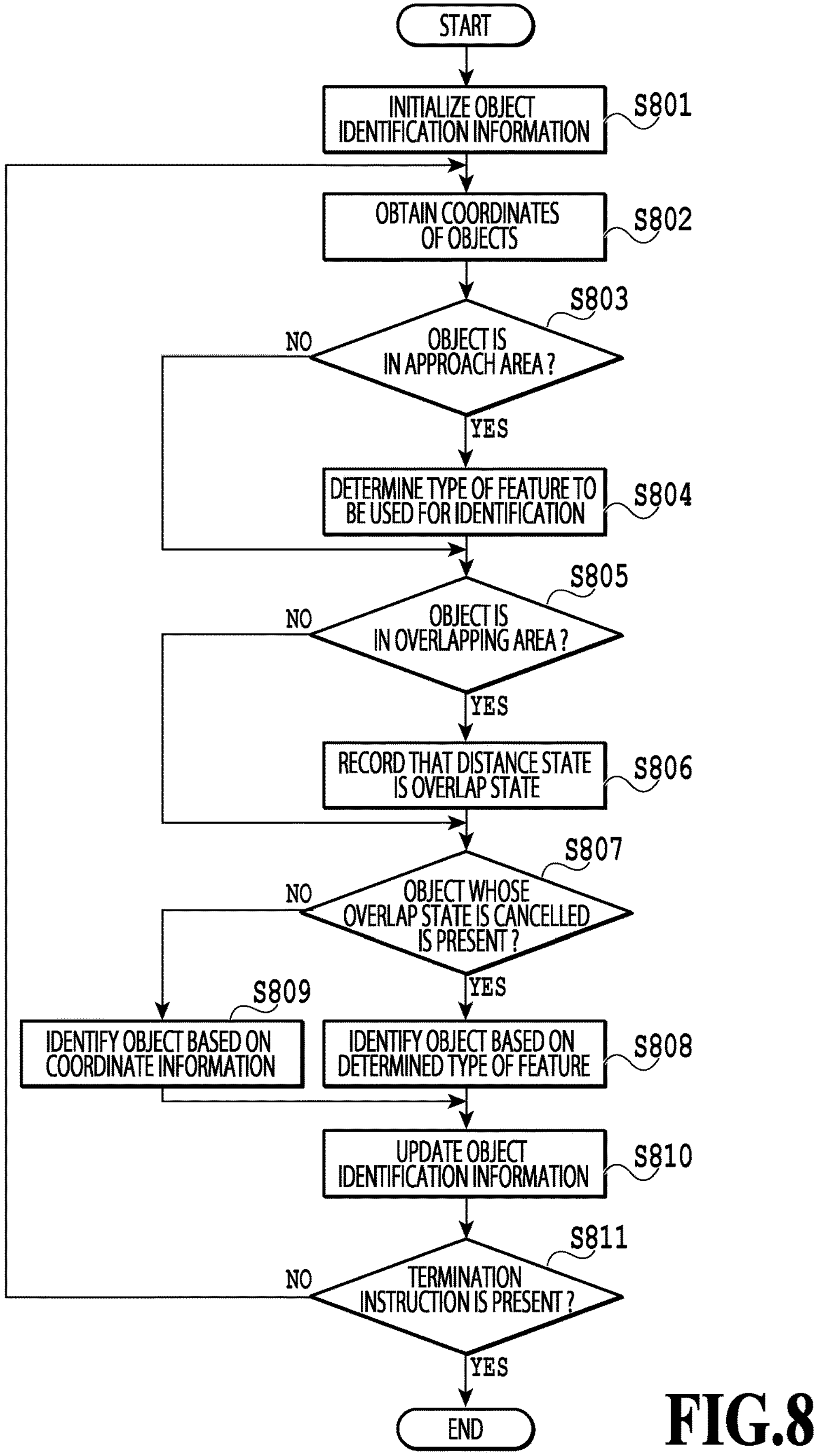
FIG. 8 is a flowchart for explaining object identification processing.

FIG. 8 is a flowchart explaining a processing procedure of processing of identifying the objects in the present embodiment. The CPU of the information processing apparatus 100 performs a series of processes illustrated in the flowchart of FIG. 8 by loading a program code stored in the ROM onto the RAM and executing the program code. Moreover, functions of all or part of steps in FIG. 8 may be implemented by hardware such as an ASIC or an electronic circuit. Note that the sign "S" in the explanation of each process means step in the flowchart, and the same applies to flowcharts hereafter.

In S801, the object identification unit 104 initializes the object identification information.

FIG. 9 is a diagram for explaining an example of the object identification information. The object identification information of the present embodiment holds, for each object, information on items of an ID of the object, an identification result, coordinate information, a distance state, a target object, and an identification method. Explanation is given assuming that the object identification information of FIG. 9 is the object identification information generated in the case where four objects are present in the image capturing space to simplify the explanation.

The "ID" is a unique identifier appended to the object in the image capturing space. The identifier is appended to each bounding box including the object.

The "identification result" is information expressing whether the object is the player or the ball, and in the case of the player, which player the object is.

The "coordinate information" is information obtained by the object coordinate obtaining unit 102 and is information on the position where the object is present.

The "distance state" is information expressing the distance between the objects explained by using FIG. 7. In the case where another object is outside the overlap area and is inside the approach area, "approach" is held. In the case where another object is outside the approach area, "independent" is held. In the case where another object is in the overlap area, "overlap" is held. In the case where the distance state changes from overlap to a state other than overlap, "overlap cancel" is held.

The "target object" is the object included in the approach area or the overlap area in the case where the above-mentioned distance state is "approach" or "overlap", and the ID of the target object is held in the column of the "target object". For example, in the case where the object with ID of "1" and the object with ID of "2" are included in each other's approach area, "2" is held in the column of target object for the ID of "1". Meanwhile, "1" is held in the column of target object for the ID of "2".

Information determined to be the information that differs between the object and the target object from among the pieces of information on the multiple types of features is held in the "identification method". As described above, in the case where the distance state of a certain object becomes "approach", the information on the feature that differs between the certain object and the target object is determined from among the pieces of information expressing the multiple types of features, and the determined information is held.

In the initialization, the object identification unit 104 obtains the information on the coordinates of the objects from the object coordinate obtaining unit 102, and updates the "coordinate information" of each object in the object identification information. In the present embodiment, values held in the coordinate information are assumed to be values of an X axis coordinate and a Y axis coordinate to simplify the explanation. Note that a value of a Z axis coordinate may also be obtained as the coordinate information.

The object identification unit 104 determines and updates the "distance state" of each object in the object identification information based on the coordinate information. The following explanation is given assuming that all objects are outside the approach areas and are "independent" at the moment of the initialization.

In the initialization, the object identification unit 104 obtains the information on the multiple types of features for each of all objects in the image capturing space, from the object feature obtaining unit 103.

For example, the object feature obtaining unit 103 obtains the information on the volume of the object, and identifies whether the object is a player or a ball. Moreover, for example, the object feature obtaining unit 103 generates the color histograms corresponding to all objects, and obtains the representative colors of the uniforms as the color information. Furthermore, the object feature obtaining unit 103 performs the character recognition processing on the texture information of all objects, and obtains the character information of the uniform numbers as the character information. Then, the object identification unit 104 checks a list of participating players of each team obtained in advance against the color information and the character information of the players to identify the player name of each object.

The object identification information 901 in FIG. 9A is an example of the object identification information generated by the object identification unit 104 in the initialization. The object identification information 901 is generated by the initialization processing such that the object with ID of "0" is identified to be the object of "player A", and the result of this identification is held in the "identification result" of the object identification information 901. Similarly, the ID of "1" is identified to be the "player B", and the ID of "3" is identified to be the "player C". The ID of "2" is identified to be the ball based on the feature of the volume, and the result of this identification is held in the "identification result". The generated object identification information is saved in the storage unit by the object identification information management unit 105.

In sports such as soccer, a timing at which the object identification unit 104 performs the initialization is desirably a state where the players, the ball, referees, and the like are in the independent state before kickoff.

The following processes of S802 to S810 are processing of identifying the objects in the current frame that are the processing targets. The processing of identifying the objects is performed depending on a cycle at which the coordinate information in the image capturing space is updated. For example, in the case where the coordinate information in the image capturing space is updated at 60 fps, the processing of identifying the objects that are the targets of three-dimensional model generation is performed every 16.6 milliseconds.

In S802, the object coordinate obtaining unit 102 obtains the coordinates of the objects in the current frame, and the object identification unit 104 updates the "coordinate information" of the objects. The object identification unit 104 updates the "distance state" of the objects based on the updated coordinate information.

First, S803 to S810 are explained below by using, as an example, the case where the current frame is a frame subsequent to the initialization, and the coordinates of the objects in the current frame obtained in S802 are the same as the coordinates held in the coordinate information in the object identification information 901 of FIG. 9A. Specifically, explanation is given assuming that the contents of "distance state" for the IDs of "0" to "3" are all "independent".

In S803, the object identification unit 104 determines whether there is an object included in the approach area of any of the objects. In the case where the contents of "distance state" for the IDs of "0" to "3" are all determined to be "independent" in S802, the object identification unit 104 determines that there is no object in an approach state (NO in S803), and the flowchart proceeds to S805.

In S805, the object identification unit 104 determines whether there is an object included in the overlap area of any of the objects. In the case where the contents of "distance state" for the IDs of "0" to "3" are all determined to be "independent" in S802, the object identification unit 104 determines that there is no object in an overlap state (NO in S805), and the flowchart proceeds to S807.

In S807, the object identification unit 104 determines whether an object included in the overlap area of any of the objects in a previous frame has transitioned to an approach state in the current frame. Specifically, the object identification unit 104 determines whether there is an object whose “distance state” is “overlap cancel”. In the case where the contents of “distance state” for the IDs of “0” to “3” are all determined to be “independent”, the object identification unit 104 determines that there is no object whose distance state has transitioned from the overlap state to the approach state (NO in S807), and the flowchart transitions to S809.

In S809, the object identification unit 104 appends the same IDs as the IDs appended to the respective objects in the previous frame, and identifies the objects based on the transition of coordinates without using the information on the feature. As illustrated in the object identification information 901, the “identification result” of the object with ID of “0” at the moment of initialization (previous frame) is “player A”, and the “identification result” of the object with ID of “1” is “player B”. The objects can be identified in further detail by using a correspondence between the “ID” and the “identification result” in the previous frame. As described above, in the case where the multiple objects are located far away from one another, the objects can be identified based on the coordinate information and the object identification information of the previous frame.

In S810, the object identification unit 104 updates the object identification information by using the identification results obtained in S809, and sets the updated object identification information as the object identification information of the current frame.

In S811, the object identification unit 104 checks whether a termination instruction of the processing is received. In the case where no termination instruction is received, that is in the case where there is a next frame, the processing returns to S802, and the processes of S802 to S810 are repeatedly performed on the next frame.

[Regarding Case where Distance State Include “Approach” ]

Explanation of S802 to S810 for the next frame is given assuming that the object with ID of “0” and the object with ID of “1” enter each other’s approach area, and the object with ID of “2” and the object with ID of “3” enter each other’s approach area in the next frame.

In S802, the object coordinate obtaining unit 102 obtains the coordinates of the objects in the next frame. Then, the object identification unit 104 updates the “distance state” of each object to “approach”. The object identification unit 104 further updates the “target object”. Since the object with ID of “1” has entered the approach area of the object with ID of “0”, the “target object” for the ID of “0” is updated to “1”. Similarly, the “target object” for the ID of “1” is updated to “0”.

In S803, the object identification unit 104 determines whether there is an object included in the approach area of any of the objects. In the case where the contents of “distance state” for the IDs of “0” to “3” are all determined to be “approach” in S802, the object identification unit 104 determines that there are objects in the approach state (YES in S803), and the flowchart proceeds to S804.

In S804, the object identification unit 104 determines the type of feature to be used for the identification of the objects. The object identification unit 104 compares the pieces of information on the multiple types of features for the respective multiple objects in the approach state, that is the two objects with ID of “0” and ID of “1”. For example, assume that the objects with ID of “0” and ID of “1” are players of different teams. In this case, there is a difference in at least the color information obtained based on the color histograms as described above. Accordingly, the object identification unit 104 determines the color information as the information on the type of feature with a difference that is to be used to identify the objects with ID of “0” and ID of “1”.

Moreover, the object identification unit 104 similarly compares the pieces of information on the multiple types of features for the respective objects with ID of “2” and ID of “3”. Since the object with ID of “2” is the ball and the object with ID of “3” is the player, there is a difference in at least the information on the volume. Accordingly, the object feature obtaining unit 103 determines the information on the volume as the information on the type of feature with a difference.

Note that, in the case where there are difference in multiple pieces of information and the objects can be thus identified by using the multiple pieces of information, information on a feature that requires a smaller processing load (computation amount) in the identification may be determined in view of the processing load. For example, in the case where there are differences in both of the color information and the character information and load for processing of identifying the objects by using the color information is smaller, the object identification unit 104 may determine the color information in the present step.

Moreover, the feature with a difference may be determined based on a previous history. Although not illustrated, in the case where there is such a history that whether an object is the player A or the player B has been identified based on the color information, the color information may be determined based on the history.

Note that, since the generation of the color histograms and the character recognition processing are executed on all objects in the image capturing space in the initialization, the information on the type of feature with a difference may be determined based on the identification results at the moment of initialization. However, for example, there is a case where the color information is different from the color information at the moment of initialization due to smearing of the uniform caused by a progress of a game or a change in image capturing conditions such as a change in sunlight. In the case where the information corresponding to the feature is assumed to be different from the information at the moment of initialization as described above, it is preferable to obtain the information on the multiple types of features for the objects in the approach state again, and determine the information on the feature with a difference.

Since the following S805 to S806 are the same as those for the previous frame, explanation thereof is omitted.

In S807, since there is no overlap state in the previous frame, the object identification unit 104 determines that there is no object transitioning from the overlap state to the approach state (NO in S807), and the flowchart proceeds to S809.

In S809, the object identification unit identifies the objects based on the transition of coordinates and the “identification result” in the object identification information generated for the previous frame as described above. Note that the objects in the approach state may be identified by using the determined information even if the objects are not in the overlap state in the previous frame.

In S810, the object identification unit 104 updates the object identification information. In the case where the information on the feature with a difference is determined in S804, the object identification unit 104 updates the object identification information such that the determined information is held in the “identification method”. For example, the object identification information is updated such that the color information determined in S804 is held in the “identification method" of the objects with ID of "0" and ID of "1". The object identification information 902 in FIG. 9B illustrates an example of the object identification information obtained as a result of this update. The updated object identification information is saved by the object identification information management unit 105.

As described above, the object identification unit 104 can determine in advance the information on the feature of the objects to be used in the case where the objects cannot be identified based on the transition of coordinates, by comparing the features of the objects approaching each other.

In S811, the object identification unit 104 checks whether the termination instruction of the processing is received. In the case where no termination instruction is received, that is in the case where there is a next frame, the processing returns to S802, and the processes of S802 to S810 are repeatedly performed on the next frame.

[Regarding Case where Distance State Include "Overlap" ]

Explanation of S802 to S810 for the next frame is further given assuming that the object with ID of "0" and the object with ID of "1" enter each other's overlap area in the next frame.

In S802, the object coordinate obtaining unit 102 obtains the coordinates of the objects in the next frame.

In S803, the object identification unit 104 determines whether there is an object included in the approach area. The distance states of the objects with ID of "2" and ID of "3" are "approach". Since this is the same as in the previous frame, explanation of S804 is omitted.

In S805, the object identification unit 104 determines whether there is an object included in the overlap area of any of the objects. In the case where the "distance state" for the IDs of "0" and "1" is determined to be "overlap" in S802, the object identification unit 104 determines that there are objects in the "overlap" state (YES in S805), and the flowchart proceeds to S806.

In S806, the object identification unit 104 updates the object identification information of the objects whose distance states are the "overlap" state.

Since the objects with ID of "0" and ID of "1" overlap each other, the bounding boxes of the two objects are formed as one bounding box as illustrated in FIG. 4B. Accordingly, the position of the object that used to have the ID of "1" and the position of the object that used to have the ID of "0" in the previous frame are obtained as a position of one object. Accordingly, the object identification unit 104 can determine which objects has overlapped and are recognized as one object from the object identification information of the previous frame and the coordinate information of the current frame.

For example, in the case where the object identification information 902 of FIG. 9B is the object identification information of the previous frame, the object that used to have the ID of "1" cannot be identified by using the transition of coordinates. Assume that the distance state of the object that used to have the ID of "1" in the previous frame is "approach". In this case, it is possible to determine that the object with ID of "1" has overlapped the object with ID of "0" which used to be the target object in the previous frame. As a result, the object identification information in the current frame turns into a state of object identification information 903.

Accordingly, the object identification unit 104 can determine that the object whose distance state has changed to "overlap" is the object whose ID changed to "0". Moreover, the object identification unit 104 can determine that the object with ID of "0" in the current frame includes the player A and the player B, from the object identification information 902 of the previous frame.

Next, in S807, since there is no overlap state in the previous frame, the object identification unit 104 determines that there is no object that has transitioned from the overlap state to the approach state (NO in S807), and the flowchart proceeds to S809.

In S809, the object identification unit identifies the objects other than "overlap" based on the transition of coordinates and the "identification result" in the object identification information generated for the previous frame as described above.

In S810, the object identification unit 104 updates the object identification information. The fact that the object with ID of "0" is in the "overlap" state is held in the "distance state" of the object identification information. As described above, the two objects that used to have the ID of "0" and the ID of "1" in the previous frame are recognized as one object that is the object with ID of "0". However, the color information determined in the previous frame is held as the identification method (information on the feature with a difference). Moreover, the fact that the object with ID of "0" is the player A and the player B is saved in the "identification information".

In S811, the object identification unit 104 checks whether the termination instruction of the processing is received. In the case where no termination instruction is received, that is in the case where there is a next frame, the processing returns to S802, and the processes of S802 to S810 are repeatedly performed on the next frame.

[Regarding Case where Distance State Include "Overlap Cancel" ]

Explanation of S802 to S810 for the next frame is further given assuming that the object with ID of "0" and the object with ID of "1" exit each other's overlap area and the overlap state is cancelled in the next frame.

In S802, the object coordinate obtaining unit 102 obtains the coordinates of the objects in the next frame.

Since the overlap state of the objects with ID of "0" and ID of "1" is cancelled, the bounding boxes of the respective objects are recognized as separate bounding boxes as illustrated in FIG. 4C. The object identification information in this case is in a state of object identification information 904 in FIG. 9D.

However, the objects cannot be identified based only on the transition of coordinates and the object identification information 903 of the previous frame. Accordingly, the ID of "0" or "1" is temporarily appended to the object closest to the position information of the object that used to have the ID of "0" in the previous frame. Specifically, which object is the player A and which object is the player B out of the objects with ID of "0" and ID of "1" cannot be identified from the transition of coordinates and the object identification information 903 of the previous frame.

Note that whether the distance state is the overlap cancel or not can be determined from the coordinates and the object identification information 903 of the previous frame. For example, it is possible to determine that the overlap is cancelled by calculating the crossing of the bounding boxes from coordinates of eight points that are the vertices of each bounding box.

In S803, the object identification unit 104 determines whether there is an object in the approach area. The distance states of the objects with ID of "2" and ID of "3" are "approach" state. Since this is the same as in the previous frame, explanation of S804 is omitted.

In S805, the object identification unit 104 determines whether there is an object included in the overlap area of any of the objects. The object identification unit 104 determines that there is no object in the overlap state in the current frame (NO in S805), and the flowchart proceeds to S807.

In S807, the object identification unit 104 determines whether an object included in the overlap area of any of the objects in the previous frame has transitioned to the approach state in the current frame. In S802, the "distance state" of the objects with ID of "0" and ID of "1" is "overlap cancel". Accordingly, the object identification unit 104 determines that there are objects that transitioned from the overlap state to the approach state (YES in S807), and the flowchart proceeds to S808.

In S808, the object identification unit 104 identifies the objects of "overlap cancel" by using the information determined in advance in the case where the objects were in the approach state.

For example, the object identification unit 104 identifies the objects with ID of "0" and ID of "1" by using the color information that is the identification method (information of the feature with a difference) determined in S804 for the previous frame.

The object feature obtaining unit 103 generates the color histograms for the ID of "0" and the ID of "1", and determines the representative colors of the respective objects. The object identification unit 104 can identify that the object with ID of "0" is the player A and the object with ID of "1" is the player B, from the color information obtained by the object feature obtaining unit 103 and expressing the representative colors.

Note that the objects that are not "overlap cancel" only need to be identified based on the transition of coordinates and the object identification information of the previous frame as in the process of S809.

Next, in S810, the object identification unit 104 updates the object identification information. The object identification unit 104 updates the object identification information such that the "player A" is held in the "identification result" for the ID of "0", and the "player B" is held in the "identification result" for the ID of "1" as in the object identification information 905 of FIG. 9E. The object identification information is saved by the object identification information management unit 105.

In S811, the object identification unit 104 checks whether the termination instruction of the processing is received. In the case where no termination instruction is received, that is in the case where there is a next frame, the processing returns to S802, and the processes of S802 to S810 are repeatedly performed on the next frame. In the case where the termination instruction is received, the present flowchart is terminated.

As explained above, according to the present embodiment, in the case where the overlap state (state where the objects approach and cross each other) of the objects is cancelled, the multiple objects whose overlap state is cancelled are subjected to the identification processing using the information on the feature with a difference. Thus, according to the present embodiment, the objects whose overlap state is cancelled can be re-identified. Moreover, in the method of the present invention, it is possible to re-identify the objects whose overlap state is cancelled while reducing the computation amount of the processing from that in the method in which all objects are identified by using the information on the feature.

Moreover, in the present embodiment, the information useful for identification is determined in advance. Accordingly, in the case where the objects are re-identified after the cancelation of the overlap state, there is no need to identify the objects by using multiple types of features. Thus, according to the present embodiment, it is possible to re-identify the objects at high speed while reducing the computation amount of the processing.

Note that, although the objects are explained to be identified based on the transition of coordinates before the crossing of the objects in the above explanation, the objects may be recognized by using the information on the feature, irrespective whether the recognition is performed before or after the crossing of the objects. For example, in the case where the volumes of the objects in the image capturing space that are the targets of three-dimensional model generation vary from one another, the objects may be identified by using the information on the volume irrespective whether the identification is performed before or after the crossing of the objects.

According to the present disclosure, it is possible to appropriately identify multiple objects.

Other Embodiments

In the above-mentioned embodiment, explanation is given assuming that the silhouette image extracting apparatuses 112 generates the silhouette images, the three-dimensional shape generation apparatus 113 generates the three-dimensional models, and the virtual viewpoint image generation apparatus 130 generates the virtual viewpoint image. Alternatively, for example, the information processing apparatus 100 may generate at least one of the silhouette images, the three-dimensional models, and the virtual viewpoint image.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:

one or more memories storing instructions; and one or more processors executing the instructions to:

obtain information for each of a plurality of objects included in an image capturing space of an image capturing apparatus;

identify each of the plurality of objects based on a feature of a first type among a plurality of types until a distance between the plurality of objects becomes smaller than a threshold; and identify each of the plurality of objects based on a feature of a second type that is among the plurality of types and that is different from the first type, in a case where the distance between the plurality of objects becomes the threshold or larger than the threshold after the distance between the plurality of objects becomes smaller than the threshold.

2. The information processing apparatus according to claim 1, wherein each of the plurality of objects is identified based on the feature of the second type in a case where the distance between the plurality of objects becomes the threshold or larger than the threshold after the distance between the plurality of objects becomes smaller than the threshold and where the distance between the plurality of objects is smaller than a second threshold, the a second threshold being larger than the threshold.

3. The information processing apparatus according to claim 1, wherein the feature of the first type is a position of each of the plurality of objects in the image capturing space.

4. The information processing apparatus according to claim 3, wherein the position is obtained based on a bounding box including a three-dimensional shape expressed by three-dimensional shape data of the each of the plurality of objects.

5. The information processing apparatus according to claim 1, wherein the feature of the second type is a feature relating to at least one of a color, a character, and a volume of each of the plurality of objects.

6. The information processing apparatus according to claim 5, wherein the feature of the second type is obtained based on at least one of three-dimensional shape data of the each of the plurality of objects and a captured image of the image capturing apparatus.

7. The information processing apparatus according to claim 6, wherein the feature of the second type is at least one of the feature relating to the color and the feature relating to the character of the each of the plurality of objects, and the feature relating to the color or the feature relating to the character is obtained based on the captured image.

8. The information processing apparatus according to claim 7, wherein the feature relating to the color is a feature obtained based on a mode value of a histogram of each of colors in a region of the object in the captured image.

9. The information processing apparatus according to claim 7, wherein the feature relating to the character is a feature of a character obtained by performing character recognition processing on a region of the object in the captured image.

10. The information processing apparatus according to claim 7, wherein the feature relating to the character is a character expressing a uniform number of the object.

11. The information processing apparatus according to claim 5, wherein the feature of the second type is the feature relating to the volume, and the feature relating to the volume is obtained based on three-dimensional shape data of the each of the plurality of objects.

12. The information processing apparatus according to claim 11, wherein the three-dimensional shape data of the each of the plurality of objects is generated based on a plurality of captured images obtained from a plurality of the image capturing apparatuses.

13. The information processing apparatus according to claim 1, wherein an object in a previous frame that corresponds to an object in a current frame is identified.

14. The information processing apparatus according to claim 1, wherein, in the case where the distance between each of the plurality of objects is smaller than the threshold, the plurality of objects are identified as one object.

15. An information processing method comprising:

obtaining information for each of a plurality of objects included in an image capturing space of an image capturing apparatus;

identifying each of the plurality of objects based on a feature of a first type among a plurality of types until a distance between the plurality of objects becomes smaller than a threshold; and identifying each of the plurality of objects based on a feature of a second type that is among the plurality of types and that is different from the first type, in a case where the distance between the plurality of objects becomes the threshold or larger than the threshold after the distance between the plurality of objects becomes smaller than the threshold.

16. A non-transitory computer readable storage medium storing a program which causes a computer to perform an information processing method comprising:

obtaining information for each of a plurality of objects included in an image capturing space of an image capturing apparatus;

identifying each of the plurality of objects based on a feature of a first type among a plurality of types until a distance between the plurality of objects becomes smaller than a threshold; and identifying each of the plurality of objects based on a feature of a second type that is among the plurality of types and that is different from the first type, in a case where the distance between the plurality of objects becomes the threshold or larger than the threshold after the distance between the plurality of objects becomes smaller than the threshold.

* * * * *